US008661260B2

(12) United States Patent
Leonard

(10) Patent No.: US 8,661,260 B2
(45) Date of Patent: Feb. 25, 2014

(54) METHODS AND SYSTEMS FOR INDICATING TRUSTWORTHINESS OF SECURE COMMUNICATIONS

(76) Inventor: Sean Joseph Leonard, Sacramento, CA (US)

(*) Notice: Subject to any disclaimer, the term of this patent is extended or adjusted under 35 U.S.C. 154(b) by 894 days.

(21) Appl. No.: 12/254,797

(22) Filed: Oct. 20, 2008

(65) Prior Publication Data

US 2009/0106557 A1    Apr. 23, 2009

Related U.S. Application Data

(60) Provisional application No. 60/981,479, filed on Oct. 20, 2007.

(51) Int. Cl.
*H04L 9/00*  (2006.01)
*H04L 9/30*  (2006.01)

(52) U.S. Cl.
USPC .............................. 713/179; 713/176; 380/30

(58) Field of Classification Search
USPC .................................... 713/179, 176; 380/30
See application file for complete search history.

(56) References Cited

U.S. PATENT DOCUMENTS 5,214,702 A * 5/1993 Fischer ........................... 380/30
5,473,737 A   12/1995 Harper
5,479,602 A   12/1995 Baecker et al.

(Continued)

FOREIGN PATENT DOCUMENTS

EP   1164745 A2    12/2001
EP   1164745 A2 *  12/2001  ................ H04L 9/32

(Continued)

OTHER PUBLICATIONS

Security Assertion Markup Language (SAML) 2.0 Technical Overview, Hughes et al. Feb. 20, 2005.*

(Continued)

*Primary Examiner* — Tae Kim
*Assistant Examiner* — Shu Chun Gao
(74) *Attorney, Agent, or Firm* — Knobbe Martens Olson & Bear LLP

(57) ABSTRACT

Embodiments of the present invention enable a message recipient or messaging system to indicate the trustworthiness of a message, especially messages that comprise content that has been digitally signed. In addition, embodiments may alter or control the message to change user behavior by preventing the user from doing things that the message would induce the user into doing. In some embodiments, various characteristics and indicia of the message are determined. For example, for e-mail messages having digitally signed content, certain embodiments may determine the entity or entities asserting a basis for trust, the status or role of the sender, the name of the sender, the affiliation of the sender, the messaging address the location, and the most recent status of the trust relationship. Based on the determined indicia, a plain language notification is composed and the message is displayed with the notification. For example, the notification may be displayed in a display bar above or below the message's contents, or may appear as a pop-up window. In addition, in some embodiments, the recipient may provide his or her assessment of the indicia, such as the accuracy, reliability, and the trustworthiness of the indicia. The history of interactions between various parties related to the message may also be considered. For example, the history of interactions between the sender and recipient may be considered. The trustworthiness of the certification authority or other entity may also be considered.

27 Claims, 31 Drawing Sheets

(56) References Cited

U.S. PATENT DOCUMENTS

| | | | |
|---|---|---|---|
| 5,847,707 A | 12/1998 | Hayashida | |
| 5,872,849 A | 2/1999 | Sudia | |
| 5,966,126 A | 10/1999 | Szabo | |
| 6,009,177 A | 12/1999 | Sudia | |
| 6,031,532 A | 2/2000 | Gourdol et al. | |
| 6,100,888 A | 8/2000 | Gourdol et al. | |
| 6,104,397 A | 8/2000 | Ryan et al. | |
| 6,108,783 A * | 8/2000 | Krawczyk et al. | 713/180 |
| 6,202,150 B1 | 3/2001 | Young et al. | |
| 6,289,374 B1 * | 9/2001 | Saito | 709/206 |
| 6,337,699 B1 | 1/2002 | Nielsen | |
| 6,389,136 B1 | 5/2002 | Young et al. | |
| 6,463,534 B1 | 10/2002 | Geiger et al. | |
| 6,469,722 B1 | 10/2002 | Kinoe et al. | |
| 6,469,723 B1 | 10/2002 | Gould et al. | |
| 6,501,490 B1 | 12/2002 | Bell | |
| 6,535,231 B1 | 3/2003 | Nix | |
| 6,570,597 B1 | 5/2003 | Seki et al. | |
| 6,857,105 B1 | 2/2005 | Fox et al. | |
| 6,904,416 B2 * | 6/2005 | Nassiri | 705/51 |
| 6,975,417 B1 | 12/2005 | Hilpl et al. | |
| 7,082,538 B2 | 7/2006 | Bouchard et al. | |
| 7,086,011 B2 | 8/2006 | Budrys et al. | |
| 7,130,886 B2 * | 10/2006 | Little et al. | 709/206 |
| 7,137,074 B1 | 11/2006 | Newton et al. | |
| 7,143,139 B2 * | 11/2006 | Burbeck et al. | 709/206 |
| 7,196,807 B2 * | 3/2007 | Goldstone | 358/1.15 |
| 7,231,611 B2 | 6/2007 | Kumhyr et al. | |
| 7,243,238 B2 | 7/2007 | Watanabe et al. | |
| 7,409,544 B2 * | 8/2008 | Aura | 713/162 |
| 7,437,558 B2 * | 10/2008 | Fenton et al. | 713/170 |
| 7,467,201 B2 * | 12/2008 | Lingafelt et al. | 709/224 |
| 7,534,160 B2 | 5/2009 | Cooper et al. | |
| 7,673,003 B2 * | 3/2010 | Little, II | 709/206 |
| 7,793,106 B2 * | 9/2010 | Bugbee | 713/176 |
| 7,831,834 B2 * | 11/2010 | Hickman et al. | 713/176 |
| 7,886,144 B2 * | 2/2011 | Brown et al. | 713/156 |
| 8,116,214 B2 | 2/2012 | Backholm et al. | |
| 2001/0035882 A1 | 11/2001 | Stoakley et al. | |
| 2001/0050990 A1 | 12/2001 | Sudia | |
| 2001/0055396 A1 | 12/2001 | Jevans | |
| 2002/0049681 A1 | 4/2002 | Herreweghen | |
| 2002/0069361 A1 | 6/2002 | Watanabe et al. | |
| 2002/0162003 A1 | 10/2002 | Ahmed | |
| 2003/0028495 A1 * | 2/2003 | Pallante | 705/78 |
| 2003/0076961 A1 * | 4/2003 | Kim et al. | 380/282 |
| 2003/0131063 A1 * | 7/2003 | Breck | 709/206 |
| 2003/0172122 A1 * | 9/2003 | Little et al. | 709/207 |
| 2004/0025057 A1 | 2/2004 | Cook | |
| 2004/0034770 A1 * | 2/2004 | Kaler et al. | 713/155 |
| 2004/0109568 A1 | 6/2004 | Slick et al. | |
| 2004/0119756 A1 | 6/2004 | Kumhyr et al. | |
| 2004/0119757 A1 | 6/2004 | Corley et al. | |
| 2004/0139162 A1 | 7/2004 | Adams et al. | |
| 2004/0255122 A1 * | 12/2004 | Ingerman et al. | 713/176 |
| 2005/0044212 A1 * | 2/2005 | Lingafelt et al. | 709/224 |
| 2005/0054334 A1 * | 3/2005 | Brown et al. | 455/414.4 |
| 2005/0097321 A1 * | 5/2005 | Zhu et al. | 713/166 |
| 2005/0157881 A1 * | 7/2005 | Van Someren | 380/286 |
| 2005/0166064 A1 | 7/2005 | Dive-Reclus et al. | |
| 2005/0246420 A1 * | 11/2005 | Little | 709/204 |
| 2005/0246535 A1 | 11/2005 | Adams et al. | |
| 2005/0246540 A1 | 11/2005 | Brown | |
| 2005/0267939 A1 | 12/2005 | Davidson et al. | |
| 2005/0278253 A1 * | 12/2005 | Meek et al. | 705/50 |
| 2005/0278775 A1 * | 12/2005 | Ross | 726/2 |
| 2006/0005009 A1 * | 1/2006 | Ball et al. | 713/155 |
| 2006/0030295 A1 | 2/2006 | Adams et al. | |
| 2006/0031315 A1 * | 2/2006 | Fenton et al. | 709/206 |
| 2006/0168022 A1 * | 7/2006 | Levin et al. | 709/206 |
| 2006/0206713 A1 * | 9/2006 | Hickman et al. | 713/176 |
| 2006/0227808 A1 | 10/2006 | Estable | |
| 2006/0259755 A1 * | 11/2006 | Kenoyer | 713/1 |
| 2006/0293035 A1 * | 12/2006 | Brown et al. | 455/414.1 |
| 2007/0022162 A1 * | 1/2007 | Thayer et al. | 709/206 |
| 2007/0022295 A1 * | 1/2007 | Little et al. | 713/176 |
| 2007/0036371 A1 | 2/2007 | Buil et al. | |
| 2007/0043949 A1 * | 2/2007 | Bugbee | 713/176 |
| 2007/0106738 A1 | 5/2007 | Barnes et al. | |
| 2007/0143596 A1 | 6/2007 | Myers et al. | |
| 2007/0174406 A1 * | 7/2007 | Morris et al. | 709/207 |
| 2007/0177823 A1 * | 8/2007 | Tredoux | 382/306 |
| 2007/0192322 A1 | 8/2007 | Dandekar et al. | |
| 2007/0220614 A1 | 9/2007 | Ellis et al. | |
| 2008/0046100 A1 | 2/2008 | Balasubramanian | |
| 2008/0046832 A1 | 2/2008 | Balasubramanian | |
| 2008/0120556 A1 * | 5/2008 | Bedingfield et al. | 715/752 |
| 2008/0133676 A1 * | 6/2008 | Choisser et al. | 709/206 |
| 2008/0141026 A1 * | 6/2008 | Cordery et al. | 713/156 |
| 2008/0148397 A1 | 6/2008 | Litvin et al. | |
| 2008/0222425 A1 * | 9/2008 | Buss | 713/185 |
| 2009/0100263 A1 | 4/2009 | Leonard | |
| 2009/0106557 A1 | 4/2009 | Leonard | |
| 2009/0113328 A1 | 4/2009 | Leonard | |
| 2010/0121928 A1 | 5/2010 | Leonard | |

FOREIGN PATENT DOCUMENTS

| | | |
|---|---|---|
| EP | 2 201 737 | 6/2010 |
| JP | 2000-010477 | 1/2000 |
| JP | 2002-057660 | 2/2002 |
| JP | 2011-501578 | 1/2011 |
| KR | 3032423 A | 4/2003 |
| WO | WO 2009/052217 | 4/2009 |
| WO | WO 2009/052524 | 4/2009 |
| WO | WO 2010/053999 | 5/2010 |

OTHER PUBLICATIONS

International Search Report and Written Opinion, Application No. PCT/US2008/080049, Application Date Oct. 15, 2008, 19 pages.
PCT International Preliminary Report on Patentability, Application No. Application No. PCT/US2008/080556, Application Date Oct. 20, 2008. 9 pages.
PCT International Search Report and Written Opinion, Application No. PCT/US2008/080556, Application Date Oct. 20, 2008. 15 pages.
PCT International Search Report and Written Opinion, Application No. PCT/US2009/063291, Application Date Nov. 4, 2009. 10 pages.
Ben Adida, et al., Lightweight Email Signatures, Computer Science and Artificial Intelligence Laboratory, Massachusetts Institute of Technology; Cambridge, MA, Feb. 1, 2006, pp. 1-20.
Garfunkel, et al., "How to Make Secure Mail Easier to Use" CHI 2005, Apr. 2-7, 2005, Portland Oregon, USA.
Masone and Smith, "Towards Usefully Secure Email" Department of Computer Science, Dartmouth College, IEEE Technology and Society (Special Issue on Security and Usability), 26 (12): 25-34. Spring 2007.
Peter Gutmann, "Why Isn't the Internet Secure Yet, Dammit?" University of Auckland, presented at the 2004 AusCERT Conference, May 23-27, 2004, pp. 1-41.
Adams, C., et al., Internet X.509 Public Key Infrastructure Time Stamp Protocol (TSP), RFC 3161, Aug. 2001.
Comodo, "Free Secure Email Certificates," <http://www.instantssl.com/ssl-certificate-products/free-email-certificate.html> (retrieved by archive.org on Oct. 11, 2007).
Esposito, Dino, "Browser Helper Objects,"<http://msdn2.microsoft.com/en-s/library/bb250436.aspx> (published Jan. 1999).
Extensions—Mozilla Developer Center, <http://developer.mozilla.org/en/docs/Extensions> (May 30, 2007).
Fu, Anthony Y., et al., "The Methodology and an Application to Fight Against Unicode Attacks," Symposium on Usable Privacy and Security (SOUPS), Jul. 12-14, 2006, Pittsburgh, PA.
Garfinkel, Simson, "Design Principles and Patterns for Computer Systems That Are Simultaneously Secure and Usable," <http://hdl.handle.net/1721.1/33204> (May 2005).
Glick, Jennifer, Mozilla/MachV: Mail: Security: Encryption and Signing, Oct. 3, 2001, http://www-archive.mozilla.org/mailnews/specs/security/.
Goodmail Systems, Senders: How It Works, http://www.goodmailsystems.com/senders/how_it_works.php (retrieved by archive.org on May 17, 2007).

(56) References Cited

OTHER PUBLICATIONS

Gutmann, Peter, "PKI Technology Survey and Blueprint," <http://www.cs.auckland.ac.nz/~pgut001/pubs/pkitech.pdf> (Mar. 31, 2003).

Housley, R., Cryptographic Message Syntax (CMS), RFC 3852, Jul. 2004.

Housley, R., Internet X.509 Public Key Infrastructure Certificate and Certificate Revocation List (CRL) Profile, RFC 3280, Apr. 2002.

IBM PCI Cryptographic Coprocessor, described in IBM Cryptographic Products: IBM PCI Cryptographic Coprocessor: General Information Manual, May 2002, 6th ed., IBM Corporation.

Jackson, Collin, et al., "An Evaluation of Extended Validation and Picture-in-Picture Phishing Attacks," Proceedings of Usable Security (USEC'07), Feb. 2007.

Jones, Richard and Sean Leonard, software product entitled "Gmail S/MIME 0.2.4" (Jul. 26, 2007), described in <http://richard.jones.name/google-hacks/gmail-smime/gmail-smime.html>.

Klensin, J., Simple Mail Transfer Protocol, RFC 2821, Apr. 2001.

Krammer, Victor, "Phishing Defense Against IDN Address Spoofing Attacks," Proceedings of the 2006 International Conference on Privacy, Security and Trust, May 2006.

Lieberman, Eric and Robert C. Miller, "Facemail: Showing Faces of Recipients to Prevent Misdirected Email" (retrieved by archive.org on Aug. 24, 2007).

PCT International Preliminary Report on Patentability and Written Opinion, Application No. PCT/US2009/063291, dated May 10, 2011. 6 pages.

PCT International Preliminary Report on Patentability and Written Opinion, dated Apr. 29, 2009, re PCT Application No. PCT/US2008/080049, application dated Oct. 15, 2008, in 19 pages.

Plaxo Products, <http://www.plaxo.com/products> (retrieved by archive.org on Oct. 11, 2007).

Ramsdell, B., S/MIME Version 3 Message Specification, RFC 2633 (Jun. 1999).

Wu, Min, et al., "Do Security Toolbars Actually Prevent Phishing Attacks?" CHI 2006, Apr. 22-27, 2006, ACM, Montreal, Quebec, Canada.

Japanese Office Action (Notice of Reason for Rejection), re JP Application No. JP 2010-530184, dated Apr. 2, 2013.

Kimura, Ken: "The 4th Windows 2000/NT Q&A." Windows2000 World/IDG, Sep. 1, 2000, vol. 5, No. 9, pp. 164-169.

Mambo, et al.: "The Latest Circumstances of Encryption 8 Key Distribution, Key Management and Authentication." Bit/Aug. 1996/ vol. 28, No. 8, p. 87-95.

\* cited by examiner

SAMPLE INDICIA

Comodo says this e-mail is from someone at alice@webmail.com.    | Trust It | | Don't Trust It | More Info Comodo says that this e-mail is authentic.    More Info | Less Info Comodo says that Ben Bitdiddle <ben@bitdiddle.com> sent this e-mail.

Comodo attests that John Smith sent this e-mail (but does not attest to the e-mail address of John Smith).

VeriSign attests that the company Bank of America (of Charlotte, NC) <news@bofa.com> sent this e-mail.
  | Trust It | | Don't Trust It | More Info This e-mail is from ben@bitdiddle.com (verified by Thawte).    More Info | Less Info Thawte identifies someone at alice@webmail.com as the sender.

Thawte says someone at alice@webmail.com sent this message.

The company Bank of America (Charlotte, NC, USA) <news@bofa.com> sent this message (according to VeriSign).
  | Trust It | | Don't Trust It | More Info The company Bank of America (Charlotte, NC, USA) <news@bofa.com> sent this message (according to VeriSign).

Bank of America (a company in Charlotte city, NC state, US country) <news@bofa.com> sent this message
  (according to VeriSign).

FIG. 5A

TIME STAMPING

Alyssa P. Hacker <alyssa@webmail.com> sent this message (according to VeriSign) at 9/29/2007 1:12am CDT (according to Comodo Time Stamping Services).   I Trust It | I Don't Trust It | More Info VeriSign says Alyssa P. Hacker <alyssa@webmail.com> sent this message (still good; your mail server says it was received at 9/29/2007 1:15am CDT).   I Trust It | I Don't Trust It | More Info

FIG. 5B

DEGREES OF INFORMATION

Authenticated: From Ben Bitdiddle <ben@bitdiddle.com> (by VeriSign), sent at 9/29/2007 1:12am CDT (by Comodo), received at 9/29/2007 2:13am EDT (by VeriSign). More Info    | Less Info Authenticated by VeriSign: From Ben Bitdiddle <ben@bitdiddle.com>, received at 9/29/2007 2:13am EDT. More Info | Less Info Authenticated by VeriSign: From Ben Bitdiddle <ben@bitdiddle.com>, dated 9/29/2007 1:12am CDT. More Info | Less Info VeriSign: From Ben Bitdiddle <ben@bitdiddle.com>.    More Info | Less Info VeriSign: This message is authentic.    More Info

FIG. 5C

EXPIRED CERTIFICATES

Thawte says someone at alice@webmail.com sent this message, but this person's identifying information is old (expired 10/1/2007).    It's Okay this Time | Don't Trust It | More Info

FIG. 5D

MESSAGE DIGEST FAILURE

Someone (or something) tampered with this message.    What's Wrong | Delete | Display Anyway This message is not authentic.    What's Wrong | Delete | Display Anyway Bogus message!    What's Wrong | Delete | Display Anyway

FIG. 5E

REVOKED CERTIFICATES

Thawte says that you should not trust messages from this person at address ben@bitdiddle.com after 9/29/2007 1:12am CDT, including this one.   What's Wrong | Delete | Display Anyway The sender Ben Bitdiddle <ben@bitdiddle.com> reported to Thawte that you should not trust this message, or any message after 9/29/2007 1:12am CDT.   What's Wrong | Delete | Display Anyway The sender Ben Bitdiddle <ben@bitdiddle.com> says that you should not trust this message, or any message after 9/29/2007 1:12am CDT (from Thawte).   What's Wrong | Delete | Display Anyway Thawte says that this message is from someone at alyssa@bitdiddle.com, sent 9/29/2007 1:12am CDT (according to Comodo). According to Thawte, only messages before 10/15/2007 at 7:00am CDT are good. Change Details | I Don't Trust It | More Info Thawte says that this message is from someone at alyssa@bitdiddle.com, received 9/29/2007 1:19am CDT (according to your mail server). According to Thawte, only messages before 10/15/2007 at 7:00am CDT are good.   I'll Change Details | I Don't Trust It | I Don't Trust My Mail Server | More Info

FIG. 5F

Comodo says ...

Date: Today at 1:11pm
To: ben@bitdiddle.com
Subject: I Like Cheese Sandwiches

Comodo says:

- This e-mail is from the individual Alyssa P. Hacker at alyssa@webmail.com, and
- is still good as of today. } 606

Comod Time Stamping Services says:

- This e-mail was sent today at 1:14pm.

I Trust It | I Don't Trust It | More Info

*(disappearing in 3 seconds)* | Dismiss to Header Now

FIG. 6B

*[Unsigned]*

From: Alyssa P. Hacker <alyssa@hacker.com>

From: someone claiming to be Alyssa P. Hacker <alyssa@hacker.com>

FIG. 7A

*[Signed]*

From: <alyssa@hacker.com> ✓ (by VeriSign)  |I Trust It | I Don't Trust It | More Info Date: 9/29/2007 1:12am CDT ✓ (by Comodo) More Info

*["More Info," "[Don't] Trust It," etc. omitted in figures for brevity]*

From: Individual <alyssa@hacker.com> ✓ (by VeriSign) (unauthenticated: "Alyssa P. Hacker")  Less Info From: Someone at alyssa@hacker.com ✓ (by VeriSign) (unauthenticated: "Alyssa P. Hacker")  Less Info From: Individual Ben Bitdiddle <ben@bitdiddle.com> ✓ (by Thawte)

From: Bank of America (Charlotte, NC) <news@bofa.com> ✓ (by Thawte)

From: Company Bank of America (Charlotte, NC) <news@bofa.com> ✓ (by Thawte)

[If the unauthenticated From line contains "Bank of America" (matching the Organization or Common Name), there is a match. If the From line contains the exact string "Bank of America (Charlotte, NC)" there is a match as well.]

From: Bank of America (Charlotte, NC) <news@bofa.com> ✓ (by Thawte)    More Info

*[For mismatch cases:]*

From: Bank of America (Charlotte, NC) <news@bofa.com> ✓ (by Thawte) (unauthenticated: "Bank of America (Charlestown, SC)")

FIG. 7B

[Signed]

From: <alyssa@hacker.com> ✓ (by VeriSign)        |Trust It | I Don't Trust It | More Info Date: 9/29/2007 1:12am CDT ✓ (by Comodo) More Info

["More Info," "I [Don't] Trust It," etc. omitted in figures for brevity]

From: Individual <alyssa@hacker.com> ✓ (by VeriSign) (unauthenticated: "Alyssa P. Hacker")    Less Info From: Someone at alyssa@hacker.com ✓ (by VeriSign) (unauthenticated: "Alyssa P. Hacker")    Less Info From: Individual Ben Bitdiddle <ben@bitdiddle.com> ✓ (by Thawte)

From: Bank of America (Charlotte, NC) <news@bofa.com> ✓ (by Thawte)

From: Company Bank of America (Charlotte, NC) <news@bofa.com> ✓ (by Thawte)

[If the unauthenticated From line contains "Bank of America" (matching the Organization or Common Name), there is a match. If the From line contains the exact string "Bank of America (Charlotte, NC)" there is a match as well.]

From: Bank of America (Charlotte, NC) <news@bofa.com> ✓ (by Thawte)     More Info

[For mismatch cases:]

From: Bank of America (Charlotte, NC) <news@bofa.com> ✓ (by Thawte) (unauthenticated: "Bank of America (Charlestown, SC)")

FIG. 7C

SELF-SIGNED SENDER

The sender says that the sender sent this e-mail.   Display Message | Ignore It | Delete It | Block It | More Info

FIG. 9A

UNTRUSTED AUTHORITY (SELF-SIGNED)

Some entity says that the sender sent this e-mail.   Display Message | Ignore It | Delete It | Block It | More Info Someone says that the sender sent this e-mail.   Display Message | Ignore It | Delete It | Block It | More Info Some company says that the sender sent this e-mail.   Display Message | Ignore It | Delete It | Block It | More Info

*User: Display Message. System: displays message.*

Some company says that the sender sent this e-mail.   Ignore It | Delete It | Block It |
    I Might Trust It—Show More (strongly discouraged) | More Info

FIG. 9B

DECISION PATHS: PERSONAL CASE

Comodo says someone at ben@bitdiddle.com sent this message.  | Trust It | | Don't Trust It | Block Sender Comodo says someone at ben@bitdiddle.com sent this message (still valid as of today).
| Trust It | | Don't Trust It | Block Sender

*User: Yes—I Trust It. System: expands user interface.*

What do you trust? (check)
- ☑ E-Mail: ben@bitdiddle.com    ✓ (by Comodo)
- ☐ Given Name: Benjamin
- ☐ Family Name: the MASTER OF THE UNIVERSE!!@ Little
- ☐ Salutation:
- ☐ City:
- ☐ State:
- ☐ Country:
- Validity Dates: Good from yesterday through 10/16/2008.

Address Book:
- ☐ Add to my address book.
- ☐ Link to "ben@bitdiddle.com" who is already in my address book.

Save This | More Info (Advanced)

*System: confirms selections and retracts user interface.*

*User: Edit {remove "MASTER..." from Family Name, add "Mr." to Salutation}, Check {Family Name, Salutation}, Save This.*

According to you, Mr. Little <ben@bitdiddle.com> sent this message (still valid as of today, says Comodo).
I'll Change Details | I Don't Trust Mr. Little Anymore

FIG. 10A

DECISION PATHS: CORPORATE CASE

VeriSign says this e-mail is from the company Bank of America (Charlotte, NC) <news@bofa.com>, and is still good today.  I Trust It | I Don't Trust It | More Info

*User: I Trust It. System: expands user interface.*

What do you trust? (check)
- ☑ E-Mail: news@bofa.com  ✓ (by VeriSign)
- ☑ Org Name: Bank of America  ✓ (by VeriSign)
- ☑ Department: Mass Mailing Department  ✓ (by VeriSign)
- ☐ Phone: (800) 555-5555
- ☑ City: Charlotte  ✓ (by VeriSign)
- ☑ State: NC  ✓ (by VeriSign)
- ☑ Country: USA  ✓ (by VeriSign)
- ☐ Icon: [Pick Icon]

Save This | More Info (Advanced)

*User: Edit (change "Phone" to local branch (312) 333-2222, add icon), Check (phone and icon), More Info (Advanced).*

*System: expands user interface.*

Display the following automatically when VeriSign says so? (check)
- ☑ E-Mail ✓ (VeriSign verifies this)
- ☑ Org Name ✓ (VeriSign verifies this)
- ☐ Department ✓ (VeriSign verifies this)
- Phone:
  - ☑ When VeriSign checks ✓ (VeriSign verifies this)
  - ☐ When VeriSign does not check  ? (Senders can put whatever they want)
- ☑ City ✓ (VeriSign verifies this)
- ☑ State ✓ (VeriSign verifies this)
- ☐ Country ✓ (VeriSign verifies this)
- ☐ Icon  ? (Senders can put whatever they want)

With VeriSign in general:
View Certification Practice Statement
I Don't Trust VeriSign Anymore With senders' information that you say is trustworthy, always display:
☑ E-Mail  ☑ Org Name  ☐ Department  ☐ Phone  ☑ City  ☑ State  ☐ Country  ☑ Icon Save All of This

*User: Check (always display phone when I say), Save All of This.*
*System: confirms selections and retracts user interface.*

According to you, Bank of America (Charlotte, NC) <news@bofa.com> (312) 333-2222 [icon] sent this message (still valid as of today, says Comodo).  I'll Change Details | I Don't Trust Mr. Little Anymore

FIG. 10B

DECISION PATHS: UNTRUSTED CORPORATE CASE

VeriSign says this e-mail is from the company Bank of America (Charlotte, NC) <news@bofa.com>, and is still good today.   I Trust It | I Don't Trust It | More Info

*User: I Don't Trust It. System: expands user interface.*

This sender will be blocked from now on.   Undo | More Info

With VeriSign in general:
View Certification Practice Statement
I Don't Trust VeriSign Anymore
I Only Trust Some of what VeriSign Says (Advanced)

*User: I Only Trust Some of what VeriSign Says. System: expands user interface.*

Display the following automatically when VeriSign says so? (check)
☑ E-Mail ✓ (VeriSign verifies this)
☑ Org Name ✓ (VeriSign verifies this)
☐ Department ✓ (VeriSign verifies this)
Phone:
  ☑ When VeriSign checks ✓ (VeriSign verifies this)
  ☐ When VeriSign does not check ? (Senders can put whatever they want)
☑ City ✓ (VeriSign verifies this)
☑ State ✓ (VeriSign verifies this)
☐ Country ✓ (VeriSign verifies this)
☐ Icon ? (Senders can put whatever they want)

FIG. 10C

Since last week, you say Mr. Little <ben@bitdiddle.com> sent this message (checking...).
I'll Change Details | I Don't Trust Mr. Little Anymore Since last week, you say Mr. Little <ben@bitdiddle.com> sent this message (checked today by Comodo).
I'll Change Details | I Don't Trust Mr. Little Anymore Since last week, you say Mr. Little <ben@bitdiddle.com> sent this message (still good as of today, says Comodo).
I'll Change Details | I Don't Trust Mr. Little Anymore Comodo says that this message is probably from an attacker, even though it claims to be from Mr. Little <ben@bitdiddle.com> (whom you trusted since last week).     Display Message Anyway | I Don't Trust Mr. Little Anymore Comodo says that this message is not from Mr. Little <ben@bitdiddle.com>, because Mr. Little told Comodo yesterday that his or her identity was stolen.     Display Message Anyway | I Don't Trust Mr. Little Anymore Mr. Little <ben@bitdiddle.com> says that this e-mail is not from him or her (discovered via Comodo as of yesterday).     Display Message Anyway | Explain | I Don't Trust Mr. Little Anymore

FIG. 11

Thawte says that someone named Liz Carlson, but this one at liz@companycorp.biz, sent this message. Don't confuse this sender with the other Liz Carlson! Let Me Compare    | I Trust the New Liz Carlson | I Don't Trust the New Liz Carlson

FIG. 12

Mr. Little <ben@bitdiddle.com> (according to you) (checking...) updated his identifying information through 10/5/2009.    Let Me See the Updated Info | I Don't Trust Mr. Little Anymore

FIG. 13

Mr. Little <ben@bitdiddle.com> (according to you) (still good today, says Comodo) updated his identifying information through 10/5/2009. This information was added to your trust list.    Let Me See the Updated Info | I Don't Trust Mr. Little Anymore

FIG. 14

Thawte says that someone named Liz Carlson <liz@companycorp.com>, but this one with a different identifier, sent this message. Don't confuse this sender with the other Liz Carlson! Let Me Compare    | I Don't Trust the New Liz Carlson

FIG. 15A

This message may not be trustworthy because Liz Carlson <liz@companycorp.com> (who since 1/1/2007 usually sends identifying information) did not provide any identifying information here.    Ask Liz Privately | Let Me Compare | I Don't Trust this Sender | Explain This message may not be trustworthy! The company Bank of America (Charlotte, NC) <news@bofa.com>, which since 1/1/2007 always sends identifying information, did not provide any here.    Contact Bank of America at (800) 555-5555 | Let Me Compare | I Don't Trust this Sender | Explain

FIG. 15A

Dear Liz,

Your last message with the subject line "FILL OUT THIS SURVEY" looked suspicious. If it really was from you, can you reply with the following code in your response? <3738217>

Thanks,

Alice

FIG. 15B

This message is probably safe since it responds to your private question yesterday to Liz Carlson <liz@companycorp.com>, and contains the confirmation code 373821Z you sent.    Let Me Compare | Report This | I Don't Trust this Sender Anymore

FIG. 15C

Since last week, you say Liz Carlson at CompanyCorp of Delaware <liz@companycorp.com> sent this message (still good as of today, says Comodo).    I'll Change Details | See other Liz Carlson People | I Don't Trust Mr. Little Anymore

FIG. 15D

Example of CertifiedMail with links and images intact

```
Certificate:
    Data:
        Version: 3 (0x2)
        Serial Number:
            28:33:b9:f3:68:f7:e6:fe:5c:91:88:10:3d:71:bf:a4
        Signature Algorithm: sha1WithRSAEncryption
        Issuer: C=US, O=WeCerifyStuff, Inc., CN=WeCerifyStuff Marketing CA
        Validity
            Not Before: Jul  1 05:40:22 2007 GMT
            Not After : Jun 30 05:40:22 2008 GMT
        Subject: O=Living Chocolates LLC, OU=Marketing Department, L=Eugene,
          ST=OR, C=US, CN=Living Chocolates LLC/emailAddress=news@lc.com
        Subject Public Key Info:
            Public Key Algorithm: rsaEncryption
            RSA Public Key: (2048 bit)
                Modulus (2048 bit):
                    00:ab:83:52:58:86:cd:05:23:19:5e:c3:a6:09:37:
                    2f:48:cf:23:c8:93:93:a5:fa:2a:65:2e:0f:53:52:
                    […]
                Exponent: 65537 (0x10001)
        X509v3 extensions:
            X509v3 Key Usage: critical
                Digital Signature, Key Encipherment
            X509v3 Basic Constraints: critical
                CA:FALSE
            X509v3 Extended Key Usage:
                E-mail Protection, Marketing
            Netscape Cert Type:
                S/MIME
            X509v3 Certificate Policies:
                Policy: 1.3.6.1.4.1.6449.1.2.1.1.1
                  CPS: https://secure.wecertifystuff.net/CPS
            X509v3 CRL Distribution Points:
                URI:http://crl.wecertifystuff.com/marketing.crl
            Authority Information Access:
                CA Issuers - URI:http://crt.wecertifystuff.com/issuers.crt
            X509v3 Subject Alternative Name:
                email:news@lc.com

Role-Specific Information (1.2.9999.1):
                Update Profile (1.2.9999.1.1):
                 URI:https://lc.com/marketing/update?*
                Unsubscribe (1.2.9999.1.2):
                 URI:https://lc.com/marketing/unsubscribe?*
                Privacy Policy (1.2.9999.1.3):
                 URI:https://lc.com/marketing/privpolicy

Signature Algorithm: sha1WithRSAEncryption
        84:83:8c:94:23:d0:91:fc:6d:14:ac:62:f5:c9:3c:e3:ce:ba:
        d3:12:d6:b7:e7:c0:d3:a5:ef:f9:d8:e5:1b:61:d5:bd:33:fc:
        […]
```

FIG. 18

WeCertifyStuff says this marketing message is from Living Chocolates LLC (Eugene, OR) <news@lc.com> (still good as of today).   I Trust It | I Don't Trust It | More Info
WeCerifyStuff says you can safely:
• Update Your Profile: <https://lc.com/marketing/update?09572908> (Sends Personal Info) | Without Info
• Unsubscribe: <https://lc.com/marketing/update?09572908> (Sends Personal Info) | Without Info
• View the Living Chocolates LLC Privacy Policy: <https://lc.com/marketing/privpolicy> (No Personal Info)

FIG. 19

Since last week, you say this marketing message is from Living Chocolates LLC (Eugene, OR) <news@lc.com> (WeCertifyStuff: still good as of today).   |Don't Trust It | More Info
You can safely:
• Update Your Profile: <https://lc.com/marketing/update?09572908> (Sends Personal Info) | Without Info
• Unsubscribe: <https://lc.com/marketing/update?09572908> (Sends Personal Info) | Without Info
• View the Living Chocolates LLC Privacy Policy: <https://lc.com/marketing/privpolicy> (No Personal Info)

*User: I Don't Trust It. Or, User: This Is Spam. System: intercepts request, and expands user interface.*

Why? You said that you trusted Living Chocolates LLC marketing messages last week!
I don't want these kinds of messages from Living Chocolates LLC.
I trust Living Chocolates LLC, but this message doesn't look like it came from Living Chcolates LLC.
I don't remember saying that I ever trusted Living Chocolates LLC.

*1. User: I don't want.*

Then the polite thing is to unsubscribe at <https://lc.com/marketing/update?09572908> (Sends Personal Info) | Without Info | Don't Unsubscribe; Just Tell Mail Provider This Is Spam

*2. User: It doesn't look like Living Chocolates LLC.*

Okay, maybe someone stole the identifying information for Living Chocolates LLC. Living Chocolates LLC is no longer trusted.   Undo | More Info

*3. User: I don't remember.*

Okay, Living Chocolates LLC is no longer trusted. Now the polite thing is to unsubscribe at <https://lc.com/marketing/update?09572908> (Sends Personal Info) | Without Info |
Don't Unsubscribe; Just Tell Mail Provider This Is Spam

FIG. 21

WeCertifyStuff says this marketing message is from Living Chocolates LLC (Eugene, OR) <news@lc.com> (still good as of today).    I Trust It | I Don't Trust It | More Info
✓ All loaded images are from lc.com, and when loaded, did not reveal your personal information.
✓ All links lead to lc.com.
WeCertifyStuff says you can safely:
• Update Your Profile: <https://lc.com/marketing/update?09572908> (Sends Personal Info) | Without Info
• Unsubscribe: <https://lc.com/marketing/unsub?09572908> (Sends Personal Info) | Without Info
• View the Living Chocolates LLC Privacy Policy: <https://lc.com/marketing/privpolicy> (No Personal Info)

FIG. 22A

WeCertifyStuff says this marketing message is from Shady Deals (somewhere in Tahiti) <news@shady.com> (still good as of today).    I Trust It | I Don't Trust It | More Info
✗ Images are stored on allsgood.com and 199.199.199.199.    Show Me the Full Image URIs | More Info | Load Anyway (not recommended)
✗ There were links leading to allsgood.com, trusty.ebay.com.mafia.ru, and secure-connect-yahoo.com, but they were disabled.    Show Me the Full Link URIs | More Info | Load Anyway (not recommended)
WeCertifyStuff says you can safely:
• Update Your Profile: <https://shady.com/marketing/update?1572908> (Sends Personal Info) | Without Info
• Unsubscribe: <https://shady.com/marketing/unsub?1572908> (Sends Personal Info) | Without Info
• View the Shady Deals Privacy Policy: <https://shady.com/marketing/privacypolicy> (No Personal Info)

FIG. 22B

METHODS AND SYSTEMS FOR INDICATING TRUSTWORTHINESS OF SECURE COMMUNICATIONS

CROSS-REFERENCE TO RELATED APPLICATIONS

This application claims priority to U.S. Provisional Patent Application No. 60/981,479 filed on Oct. 20, 2007, entitled "Bootstrapped Trust Relationships," by Sean J. Leonard, which is incorporated herein by reference in its entirety.

BACKGROUND

1. Field

This invention relates to electronic communications and messaging systems. In particular, embodiments of the present invention relate to secure messaging systems, such as encrypted and authenticated messaging systems, and procedures and systems for determining and indicating the trustworthiness of secure messages.

2. Description of the Related Art

Today, networks like the Internet and mobile networks allow for wide access to communications and messaging, such as e-mail, text messages, instant messages, and the like. Surprisingly, however, most of this communications and messaging traffic is not secured or protected. For example, the overwhelming majority of e-mail messages are sent unencrypted and unsigned, so that any eavesdropper on a communications session over the Internet can read and alter such e-mail while in transit or in storage.

Sending and receiving encrypted and signed (e.g., authenticated) messages is a capability well-known in the art. In a typical system, a user may obtain a certificate for free or for a fee from a certification or certification authority (CA). The CA verifies the user's identity and e-mail address. The user can then navigate to CA's website and completes a series of actions, such as filling out forms, on the website. This typically entails the user entering personal data, including an e-mail address. A public-private key pair is then generated for the user. The user submits a certificate request containing his or her public key along with the rest of the aforementioned information during the course of submitting data to the website. The private key is stored on the user's computer. The CA's website then verifies the user's identity by sending a confirmation, for example, via an e-mail to the user. In the confirmation, a link is included, and when the user manually follows the link, the CA's website causes an issued certificate to be installed into the user's web browser and united with the related private key.

Unfortunately, the use of these security mechanisms is not widespread. For example, despite the existence of well-established CAs and public key infrastructure (PKI), the use of technologies such as S/MIME and PGP is not very widespread. One reason for the lack acceptance is even with the use of digital signatures and encrypted content for e-mails, it is difficult for users to know with confidence who is contacting them and who they are contacting.

A problem with many messaging systems is that a message contains information about who the message is from (for example, in the "From" line). But, the typical e-mail systems have no independent way to verify that such messages really came from the sender identified in the From line.

In addition, most users do not understand how computers or messaging services work. Instead, users generally rely upon their software and systems to have sensible defaults in the majority of circumstances. Only when such settings materially affect their computing experiences do users endeavor to change them. For example, as noted, PKI is known in the art. However, almost all users rely on PKI, without understanding how PKI works and without explicitly trusting that PKI works well or in any particular way.

Another known technology is an encrypting gateway server, which receives plaintext messages from users within an organization, examines the message against a complex set of policies, and signs or encrypts the message as it deems appropriate before passing the message onwards, all without the end user seeing the details. Yet, another known technology is to utilize self-made and self-signed certificates that are certified but through their continued use in ongoing relationships rather than by a CA or other third party.

However, the known technologies are still difficult to use and understand. Therefore, for the most part, almost all users simply avoid the known technologies or use them in an incorrect manner.

SUMMARY

In one embodiment, a method of indicating a trustworthiness of a received message comprises: receiving a message comprising content that has been digitally signed by a digital signer; accessing a set of attestations by a third-party entity "known, but not necessarily trusted" to software that received the message; identifying a cryptographic key was used to sign the message and an entity that holds the key; determining a set of indicium from said secure bindings and said cryptographically secure attestation; presenting said indicium to said user; and requesting said user to modify said indicium.

In another embodiment, a method of assessing trustworthiness of a received message comprises: receiving a message comprising content that is digitally signed by a digital signer; accessing a set of attestations by a trusted entity; identifying a cryptographic key was used to sign the message and an entity that holds the key; determining a set of indicium from said secure bindings, said cryptographically secure attestation; determining a role from said indicium; and modifying the message based on said role and said indicium to a recipient of the received message.

In another embodiment, a method of indicating a trustworthiness of a message, wherein said message comprises content that is digitally signed, comprises: determining a name of an entity sending the message; classifying the entity; determining a validity of the digital signature; composing a notification that is configured according to a set of plain language grammar templates that indicate at least the name of the entity sending the message, whether the entity is an individual or an organization, and the validity of the digital signature; and configuring the message to include the notification when the message is displayed.

In another embodiment, a method of issuing a digital certificate comprises: determining information regarding a name of a signer of a message; determining a role of the signer, wherein the role indicates types of messages that the signer will likely sign with a key associated with the digital certificate; and issuing the digital certificate based on the name of the signer and the role of the signer.

BRIEF DESCRIPTION OF THE DRAWINGS

FIG. 2A-B shows certificates from two different providers, with different formats for similar types of information.

FIGS. 5A-F show exemplary indicia that may be determined by the embodiments.

FIGS. 6A-B show exemplary displays of progressively updated indicia that attempt to train the user to pay attention to the security and trust levels.

FIG. 7A-C show exemplary indicia consolidated into a From line of an e-mail message.

FIG. 9A-B show exemplary indicia for untrusted self-signed certificates and authorities.

FIG. 10 A-C show exemplary indicia, sample user actions, system responses, and user interfaces presented when the user attempts to evolve trust relationships.

FIG. 11 shows exemplary indicia that communicate expressed changes in trust, whether from the user or from another attesting entity.

FIG. 12 shows the resolution of colliding indicia by some embodiments.

FIG. 13 shows another example of resolving colliding indicia by some embodiments.

FIG. 14 shows another example of resolving colliding indicia by some embodiments.

FIG. 15A-C show the resolution of the trustworthiness of message with various signature patterns, such as, when unsigned messages appear after a stream of signed messages.

FIG. 15D shows an exemplary user prompt that is displayed to show colliding indicia despite successful resolution of the sender's indicia.

FIG. 18 shows an exemplary digital certificate with information related to the role of the sender.

FIG. 19 shows exemplary indicia based on the digital certificate shown in FIG. 18.

FIG. 21 shows exemplary indicia, user actions, system responses, and user interfaces when the user attempts to assert a decrease in a role-based, marketing trust relationship.

FIG. 22A-B show exemplary indicia, particularly regarding images and links, according to role-based policies.

DETAILED DESCRIPTION OF EMBODIMENTS

Figure 1:
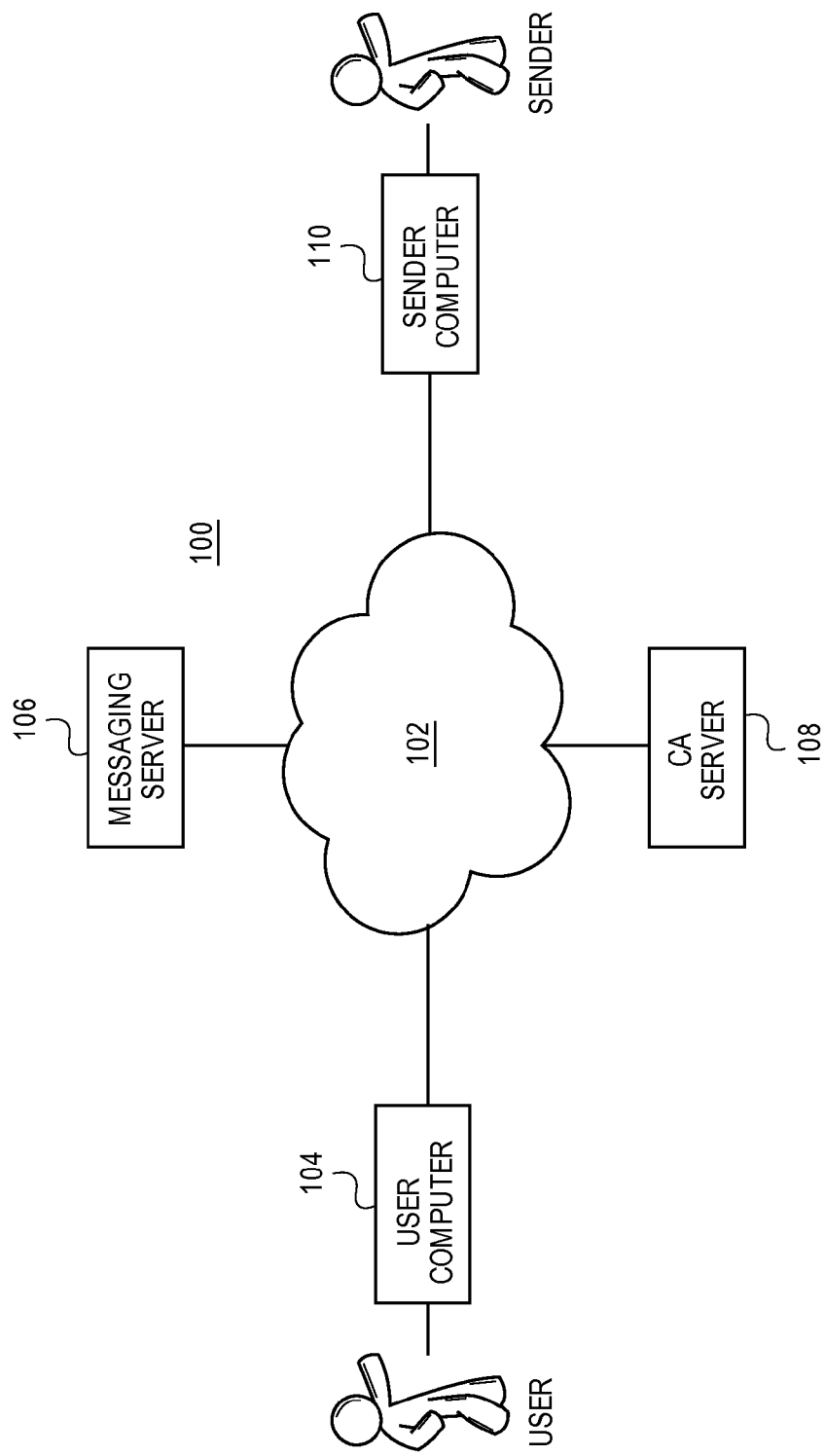
FIG. 1 shows an exemplary system consistent with embodiments of the present invention.

This invention relates to encrypted and authenticated messaging systems, specifically to the systems and methods of bootstrapping and tracking trust relationships between users, messaging services, and senders of messages. In particular, embodiments of the present invention enable a user to engage in secure communications using digital certificates and other cryptographic technologies in an easy way with a minimum of distracting interaction. Accordingly, the embodiments may be useful in determining and indicating the trustworthiness of a message. In general, trustworthiness may relate to the reliability, confidence, or accuracy, a message is viewed as having for the purpose of identifying the sender of the message. That is, the trustworthiness of a message can relate to whether the reliability of a signature as evidence that the signer is the holder of the private key and actually is the entity that sent the message.

In an exemplary embodiment, a system contains a pre-established knowledge base of trust on which a user may rely. The system further acknowledges the varying levels of trust that the user may have with his or her computing devices, messaging services and the interfaces presented by said messaging services, and senders known and unknown. As the user uses the system, the system can evolve and maintain the trust profile of the user through a combination of observed events, interactions, and explicit user acknowledgements.

In general, various parties may serve as attesters relating to the trustworthiness or reliability of a message and a user may have various trust relationships with these parties. For example, trusted introducers, certification authorities, various types of senders may be attesters in some form.

For purposes of illustration, embodiments of the present invention are described with reference to securing e-mail messages. Of course, e-mail is provided as an example and other forms of messaging, such as webmail, text messages, SMS, instant messages, are within the scope of the present disclosure. One skilled in the art will recognize that embodiments of the present invention can be implemented to any form of messaging, such as text messages, instant messages, telephone messages or calls, messages delivered orally, other forms of visual, or audio user interfaces, or other sensory user interfaces, etc.

In some embodiments, indicia about e-mail messages may be indicated when an individual e-mail is displayed or when a list view of the e-mail messages are displayed. In particular, embodiments of the invention may relate to innovative ways of displaying digitally signed e-mails or other types of messages either individually or when appearing in a list view. Unwanted messages can be indicated with various indicators, like an icon, a color, a line through the icon, fading out the message, etc. In the list view, since display space can be limited, the icon may be modified in various ways to reflect trust relationships and indicia of the e-mail messages in their current state as well as reflecting how the trust relationship has evolved over time. Unwanted messages can also be filtered from appearing in the list view. Therefore, based on the ascertained relationships where the digital signatures are involved, embodiments can modify the display and presentation of the messages and their list view.

In an exemplary embodiment, the system provides methods by which the user may become aware of his or her trust levels, based upon assertions made by digital signers. In some embodiments, the system builds upon PKI systems by acknowledging certain certificate or certification authority (CAs), and by extension, certain digital certificates that are known to be reliable. The CA may effectively be the user itself, i.e., the user acting as his or her own CA, a known or established CA, the sender of a message, or some other third party. The system may consider the CAs on a user's computer, the system's own list, or various combinations thereof, in establishing certain levels of trust in specific types and pieces of information provided by the holders of corresponding private keys to the digital certificates. These pieces of information are pieces that CAs or the user can vouch reliably.

Although PKI is described above as a security technology, the embodiments may employ any form of security mechanisms. For example, the embodiments may employ various security features of the domain name system (DNS), such as DNS security extension (DNSSE), DomainKeys and DomainKeys Indentified Mail (DKIM), pretty good privacy (PGP) and web of trust, and the like.

Figures 1, 17A:
FIGS. 17A-B show the user interface of a known system.
Figures 2A, 2B:
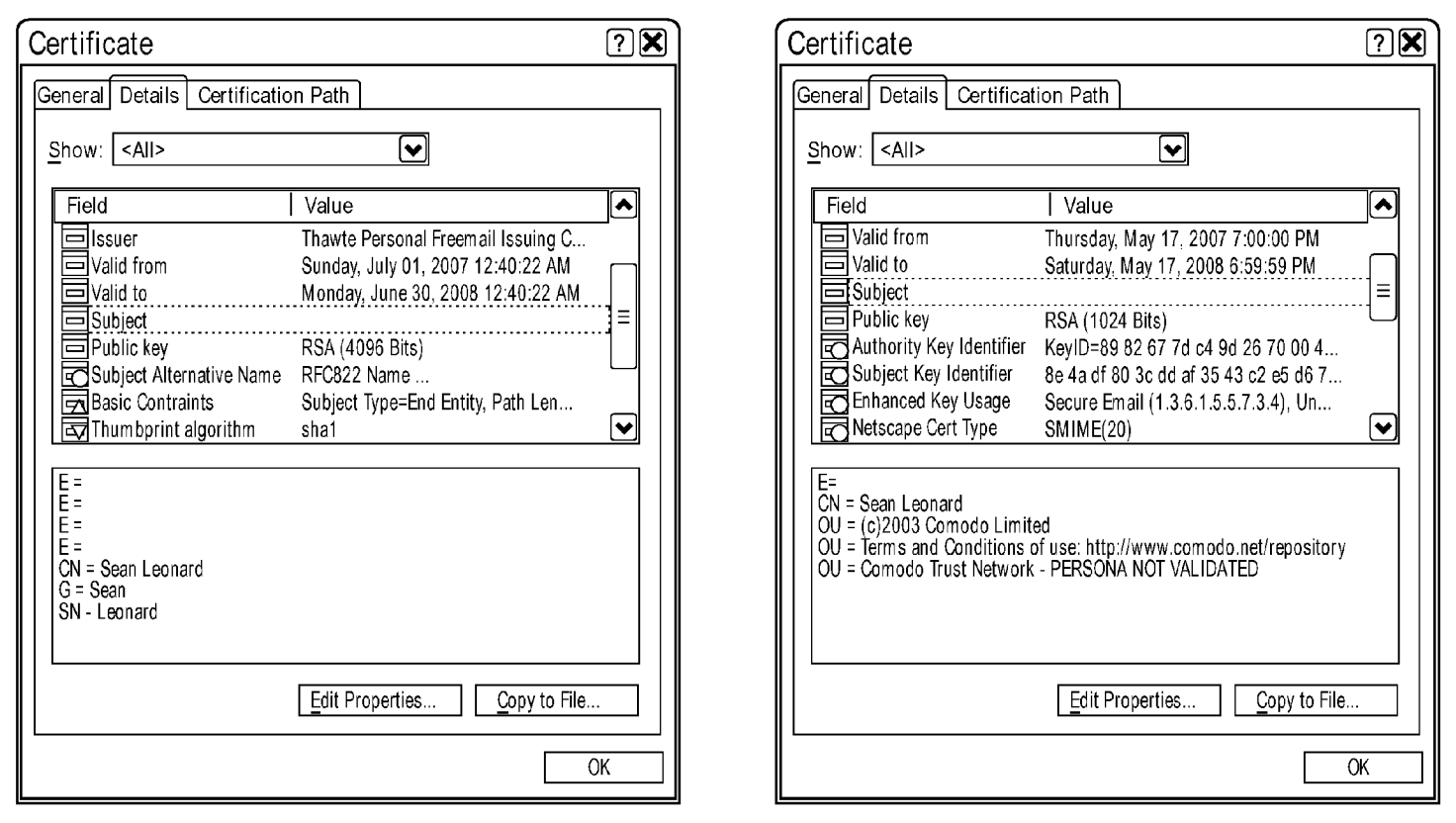
Figures 2, 17A:
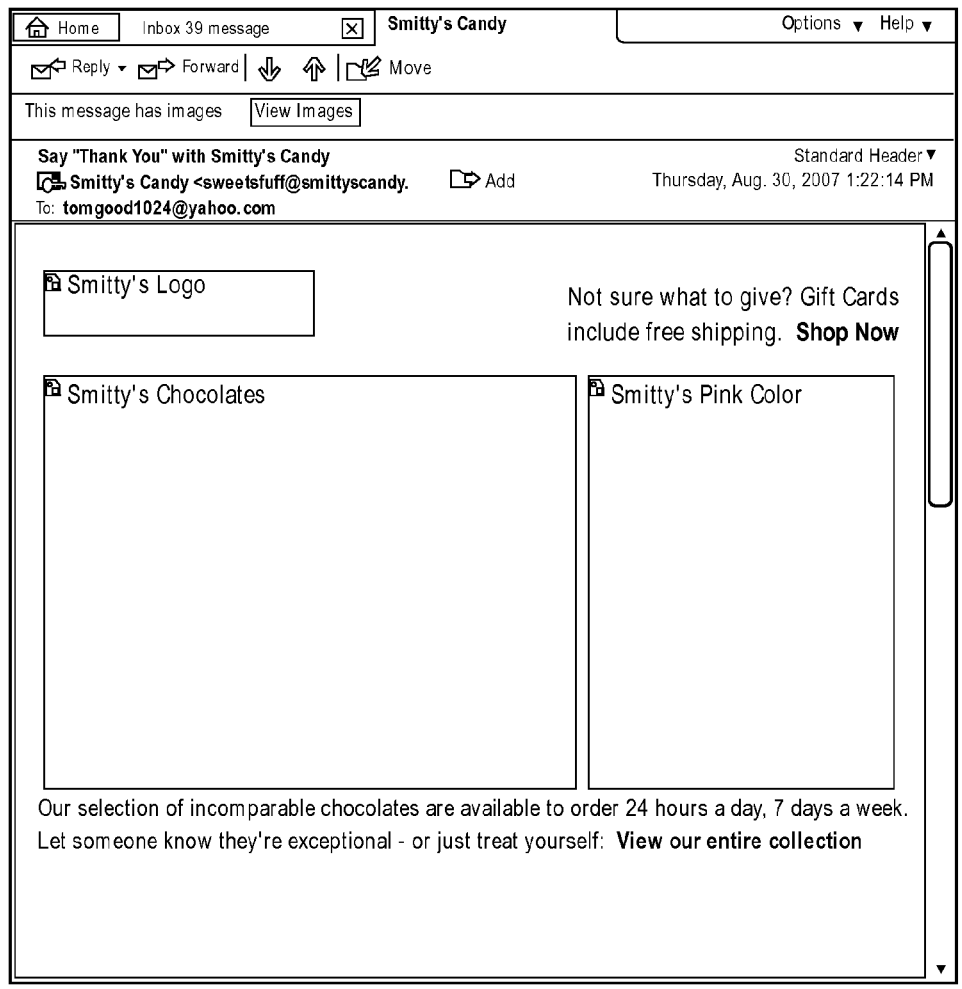

However, CAs record and present information in a relatively free-form fashion, despite standards that govern the location and formatting of said information. For example, as shown in FIGS. 2A-B, it is possible that certificates with the same technical fields and entries will correspond to different levels of verification and trust.

In order to address this situation, it is a feature of some embodiments to ascertain and visualize such relationships. Ascertaining such relationships and attestations may be determined by analyzing a CA's actual practices, for example, a CA's certificate policy statement, sample issued certificates, and the risks that a CA takes by leaving open avenues for a malicious applicant to falsify records. After these relationships and attestations are ascertained, the system designer releases those ascertainments to users in a storage mechanism (for example, in a relational database or in coded logic sequences).

Embodiments present users with information gleaned from these ascertainments in a way that will help the user verify, among other things, a sender's identity. In the embodiments, the system may indicate what the system believes to be trustworthy, how the system has arrived at certain propositions, and how the user may challenge the system's assumptions. In one embodiment, the system provides such indicia in a way that a normal user would understand by using plain language statements that avoid resorting to metaphors, symbolism, or technical jargon.

Indicia refer to any type of indication that conveys information, for example: text, images, and sounds. In an embodiment, indicia displayed may include a sender's address (such as an e-mail address) and parts of a sender's name. The indicia may further indicate a name from other known senders with identical or similar indicia. The indicia may also distinguish between different types of senders, such as corporate entities and individuals and automated processes. For example, most individuals have a family name and a given name, while corporations have a single corporate name. A corporation may have other distinguishing characteristics, such as a place of incorporation or a primary place of business.

In embodiments, the system may present and combine indicia from multiple attesters. For example, a signed message may be countersigned by a time stamping authority (TSA), whose countersignature provides evidence that a message and signature existed at least as early as the signing date. As another example, CAs may offer update services, such as certificate revocation lists and online certificate status protocol servers, to warn of the trustworthiness of particular underlying certificates if a private key is reported as compromised.

The embodiments of the present disclosure are configured to recognize that the time that the sender composes and signs a message is relevant to the question of whether the sender's signatures are trustworthy or reliable for the purpose of identifying the sender of the message. The trustworthiness of a message relates to whether the reliability of a signature as evidence that the signer is the holder of the private key and actually is the entity that sent the message. For example, an otherwise trustworthy sender may lose his, her, or its corresponding private key at time t. After time t, no signatures are trustworthy. Yet an attacker (an untrustworthy sender) can forge evidence of the date, making a message appear as if it were signed before t. Thus, in some embodiments, independent evidence can be provided that messages were composed before t in order to verify the trustworthiness of a particular message. It may be appreciated that in some embodiments, for the purpose of time-stamping, a message can include the actual message content, one or more digital signatures (or representations thereof, such as cryptographic hash values equating to the same), and indeed any other information, so that all of the actual message content, its purported signer, and any other information may be verified as existing by the time t.

The embodiments may rely on one or more of the types of evidence. The sender can procure a cryptographic time stamp from a third-party TSA. The recipient's receiving mail server may stamp the message with the date of receipt in a Received line. The receiving server can generate a cryptographic time stamp, acting as its own TSA. The receiving server can procure a cryptographic time stamp from a high-security coprocessor, acting as its own TSA. The receiving server can procure a cryptographic time stamp from a third-party TSA. The recipient can annotate or countersign the message with the user's private key, where the annotation or countersignature contains a time stamp according to the user, and while the message is otherwise known to be trustworthy. An annotation or countersignature may be appended by use of a self-addressed reply message referencing the original message, or a mechanism such as a flag or a label that the server exposes to clients to let clients add custom data to messages.

As an alternative to a digital signature, the user as the recipient can also annotate the message itself to attest respecting other aspects about the message, such as the trustworthiness or the sender's trustworthiness.

In other embodiments, the system 100 may utilize information indirectly derived in order to evaluate the trustworthiness or reliability of a message. For example, the system 100 may analyze information in online certificate status protocol (OCSP) messages. Such messages can be used to indicate the current status of a digital certificate and whether it's been revoked. The system 100 may use various information in OCSP messages, such as one or more time stamps, to make an evaluation of whether a message is trustworthy or reliable. In addition, the system 100 may employ a hash of the message, or a hash of the message including a time stamp, such as from an OCSP message, in order to make its determinations.

In one embodiment, the system relies on a response from any digital signer that acts as a neutral, independent, unbiased source of time with respect to responses that it issues, and that permits the inclusion of requestor-specified data in its response. A corresponding system from the sender's end would request such a response from the neutral third-party. Even though the neutral third-party is not purported or held out to be a time-stamp authority (TSA), so long as the signer is obligated to produce accurate time, it may be relied upon.

In one embodiment, a system for the procuring of reliable evidence of the time submits an Online Certificate Status Protocol (OCSP) request. The request includes certain information, such as a SEQUENCE of requests with certificate ID structures, each containing a hash algorithm, the issuer name hash, the issuer key hash, and the serial number of the alleged certificate. Optionally, a nonce for the request is included as one of the requestExtensions. An OCSP server (OCSP responder) returns a signed response. The signed response can include information respecting the OCSP responder itself, the time at which the response was produced, the Certificate IDs provided by the requester, and optionally, the nonce of the request. Such a request and response cycle is illustrated below.

Example of OCSP request and response cycle.
OCSP Request Data:
  Version: 1 (0x0)
  Requestor List:
    Certificate ID:
      Hash Algorithm: sha1<-CAN BE HASH ALGORITHM OF MESSAGE Issuer Name Hash: DEADBEEFE271B95183-26761CF21D4E33576A8370<-CAN BE HASH OF MESSAGE
Issuer Key Hash: DEADBEEF4C8813F0-78D98977B56DC589DFBCB17A<-CAN BE HASH OF MESSAGE
Serial Number: DEADBEEF74202438B197F1C9DE2E3610<-CAN BE HASH OF MESSAGE
Request Extensions:
 OCSP Nonce:
  DEADBEEFB3A991077B364693A4D6AAF-01576<-CAN BE HASH OF MESSAGE, INDEED, MESSAGE ITSELF<-OTHER DATA CAN GO HERE.
OCSP Response Data:
 OCSP Response Status: successful (0x0)
 Response Type: Basic OCSP Response
 Version: 1 (0x0)
 Responder Id: C=XX, ST=XXX, L=XXXX, O=Cert., CN=Class 1 OCSP, emailAddress=support@cert.org
 Produced At: Oct 20 20:10:00 2008 GMT<-HIGHLY PROBATIVE EVIDENCE OF EXISTENCE OF RECORD AT THIS TIME
 Responses:
 Certificate ID:
  Hash Algorithm: sha1
  Issuer Name Hash: DEADBEEFE271B95183267-61CF21D4E33576A8370
  Issuer Key Hash: DEADBEEF4C8813F078D-98977B56DC589DFBCB17A
  Serial Number: DEADBEEF74202438B197F1C9DE2E3610
 Cert Status: unknown<-PROBATIVE EVIDENCE THAT CERT ID CORRESPONDS NOT TO A REAL CERT (and thus to a message)
 This Update: Oct 20 20:10:00 2008 GMT<-PROBATIVE EVIDENCE OF EXISTENCE OF RECORD AFTER THIS TIME
 Next Update: Oct 20 20:20:00 2008 GMT<-PROBATIVE EVIDENCE OF EXISTENCE OF RECORD BEFORE THIS TIME
 Response Extensions:
  OCSP Nonce:
   DEADBEEFB3A991077B364693A4D6AAF01576
Certificate:
 Data:
  Version:
  Serial Number: 00000 (00000)
  Signature Algorithm: sha1WithRSAEncryption
  Issuer: O=Root CA, OU=http://www.cacert.org, CN=CA Cert Signing Authority/emailAddress=support@cacert.org
  Validity
   Not Before: Aug 22 07:13:00 2006 GMT
   Not After: Aug 22 07:13:00 2011 GMT
  Subject: C=XX, ST=XXX, L=XXX, O=Cert., CN=Class 1 OCSP
   emailAddress=support@certificationauthority.org
  Subject Public Key Info:
   Public Key Algorithm: rsaEncryption
   RSA Public Key: (1024 bit)
    Modulus (1024 bit):
     00:e1:8d:ff:c8:17:9e:de:e6:91:fd:91:80:1c:0a . . . :
    Exponent: 65537 (0x10001)

X509v3 extensions:
 X509v3 Basic Constraints: critical
  CA:FALSE
 X509v3 Extended Key Usage:
  TLS Web Client Authentication, TLS Web Server Authentication, OCSP Signing<-PROBATIVE OF THE FACT THAT THIS IS A REGULAR BUSINESS RECORD GENERATING SERVER OF THIS TYPE
 X509v3 Subject Alternative Name:
  email: support@certificationauthority.org
Example of a COMBINED OCSP REQUEST/RESPONSE CYCLE.
OCSP Request Data:
 Version: 1 (0x0)
 Requestor List:
  Certificate ID: <-A GOOD CERTIFICATE EXAMPLE
   Hash Algorithm: sha1
   Issuer Name Hash: 0000621693A6DA5AD-0B98D3A135E35D1EB183661
   Issuer Key Hash: 000071604C8813F078D-98977B56DC589DFBCB17A
   Serial Number: 123A
  Certificate ID: <-A BAD CERTIFICATE (REVOKED) EXAMPLE
   Hash Algorithm: sha1
   Issuer Name Hash: 0000621693A6DA5AD-0B98D3A135E35D1EB183661
   Issuer Key Hash: 000071604C8813F078D-98977B56DC589DFBCB17A
   Serial Number: 123B
  Certificate ID: <-A FAKE CERT ID THAT ACTUALLY CONTAINS THE MESSAGE HASH
   Hash Algorithm:
   Issuer Name Hash: CAFEBABEE271B9518326761-CF21D4E33576A8370
   Issuer Key Hash: CAFEBABE4C8813F078D-98977B56DC589DFBCB17A
   Serial Number: CAFEBABE74202438B197F1C9DE2E3610<-COMPARE THIS "FAKE" SERIAL NUMBER (ACTUALLY MESSAGE HASH) WITH THE SERIAL NUMBERS ABOVE; IT IS NOT IN THE SAME FORMAT FOR THIS CA
 Request Extensions:
  OCSP Nonce:
   CAFEBABEF9BF1550C638C0CF47F561C27CFF
OCSP Response Data:
 OCSP Response Status: successful (0x0)
 Response Type: Basic OCSP Response
 Version: 1 (0x0)
 Responder Id: C=XX, ST=XXX, L=XXX, O=Cert., CN=Class 1 OCSP, emailAddress=support@certificationauthority.org
 Produced At: Oct 20 23:09:00 2008 GMT
 Responses:
 Certificate ID:
  Hash Algorithm: sha1
  Issuer Name Hash: 0000621693A6DA5AD0-B98D3A135E35D1EB183661
  Issuer Key Hash: 000071604C8813F078D-98977B56DC589DFBCB17A
  Serial Number: 321A
 Cert Status: good<-PROBATIVE EVIDENCE THAT CERT ID CORRESPONDS TO A REAL CERT KNOWN TO AND PROBABLY ISSUED BY THIS CA (and thus NOT to a message)

```
This Update: Oct 20 20:43:00 2008 GMT
Next Update: Oct 20 23:19:00 2008 GMT
Certificate ID:
   Hash Algorithm: sha1
   Issuer Name Hash: 0000621693A6DA5AD0B98D-
      3A135E35D1EB183661
   Issuer Key Hash: 000071604C8813F07-
      8D98977B56DC589DFBCB17A
   Serial Number: 321B
Cert Status: revoked<-PROBATIVE EVIDENCE THAT
   CERT ID CORRESPONDS TO A REAL CERT
   KNOWN TO AND PROBABLY ISSUED BY THIS CA
   (and thus NOT to a message)
Revocation Time: Oct 03 16:53:00 2008 GMT
This Update: Oct 20 20:43:00 2008 GMT
Next Update: Oct 20 23:19:00 2008 GMT
Certificate ID:
   Hash Algorithm: sha1
   Issuer Name Hash: CAFEBABEE271B-
      9518326761CF21D4E33576A8370
   Issuer Key Hash: CAFEBABE4C8813F078D-
      98977B56DC589DFBCB17A
   Serial Number:
      CAFEBABE74202438B197F1C9DE2E3610
Cert Status: unknown<-PROBATIVE EVIDENCE THAT
   CERT ID CORRESPONDS NOT TO A REAL CERT
   (and thus to a message)
This Update: Oct 20 23:09:00 2008 GMT
Next Update: Oct 20 23:19:00 2008 GMT
Response Extensions:
   OCSP Nonce:
      CAFEBABEF9BF1550C638C0CF47F561C-
         27CFF<-POSSIBLE LOCATION OF MESSAGE
         HASH
Certificate:
   Data:
      Version: 3 (0x2)
      Serial Number: 00000 (00000)
      Signature Algorithm: sha1WithRSAEncryption
      Issuer: O=Root CA, OU=XX, CN=XX Cert Signing
         Authority/
         emailAddress=support@certificationauthority.org
      Validity
         Not Before: Aug 22 07:13:00 2006 GMT
         Not After: Aug 22 07:13:00 2011 GMT
      Subject: C=XX, ST=XXX, L=XXX, O=Cert.,
         CN=Class 1 OCSP/
         emailAddress=support@certificationauthority.org
      Subject Public Key Info:
         Public Key Algorithm: rsaEncryption
         RSA Public Key: (1024 bit)
            Modulus (1024 bit):
               . . . :
            Exponent: 65537 (0x10001)
      X509v3 extensions:
         X509v3 Basic Constraints: critical
            CA:FALSE
         X509v3 Extended Key Usage:
            TLS Web Client Authentication, TLS Web Server
               Authentication, OCSP Signing
         X509v3 Subject Alternative Name:
            email: support@certificationauthority.org
   Signature Algorithm: sha1WithRSAEncryption
```

The system generating the request produces an OCSP request, but replaces the user-supplied request information with the message hash or with a structure otherwise unambiguously identifying the message. This may include other stand-ins for the message, such as the hash of the SignerInfo block used in S/MIME and PKCS #7/CMS containing the message digest (or hash) of the encapsulated MIME message, or even the entire SignerInfo block or entire message itself. For example, the issuer name hash, issuer key hash, serial number, or nonce may be replaced with the hash. The issuer name hash and issuer key hash are generally constrained to the hash algorithm choice in the particular cert ID structure to be valid, but the requester may choose to generate an appropriate hash representing the message using the hash identified by the algorithm that the requester records there. The certificate serial number is generally constrained to the ASN.1 type INTEGER, which is sufficient for encoding the hash value (and possibly the algorithm choice) into a numeric value. The nonce is encoded in an extnValue which is the ASN.1 type OCTET STRING, and thus is theoretically unbounded. The entire message could be placed in the OCTET STRING, depending on the implementation and practical considerations. The extnValue for the nonce may include both the message (or its representation and optionally the corresponding hash algorithm identifier, if ambiguous) and a piece of random data that actually serves as a nonce, to obtain the freshness guarantees that nonces are supposed to provide. To avoid detection by the OCSP server of the requestor's attempt to introduce a non-OCSP-related hash into the nonce, the requester may avoid putting non-random-looking data (i.e., the algorithm identifier) into the nonce, but instead using the algorithm information in the certID as a basis for identifying the algorithm corresponding to the message hash value. In any event, the message hash may be placed anywhere in the OCSP request (such as in a new extension), so long as the OCSP responder signs it in its response.

The corresponding system that verifies this information obtains the OCSP response associated to the message via the various methods for associating described herein. In an exemplary embodiment, if the sender procures the OCSP response, one such place to put the OCSP response is in the RevocationInfoChoices structure of a SignedData structure of PKCS #7 or CMS, comprising part of an S/MIME message. One skilled in the art may identify this insertion as "OCSP stapling." When the verifying system analyzes the OCSP response, it checks for the presence of the message hash in any of the aforementioned areas. If placed in one of the certID structures, the OCSP responder's status response for that certID will probably be "unknown", since there is no issuer name, issuer key, or serial number with that hash on record. Nevertheless, that status response may be ignored, or may be used as probative evidence with respect to the reliability of the OCSP response. For instance, if the requester requested certificate IDs of certificates that actually exist (and the CA is still maintaining records of them), the expected responses would be "good" or "revoked." In contrast, the expected response is "unknown" for a requestor's request of a certificateID containing a message or representation thereof. If the OCSP responder responds "good" (or even "revoked") to the request for a certID where the certID contains message data, either the OCSP responder is unreliable (i.e., lying or negligently misrepresenting the status of certIDs for which certificates do not actually exist), or there is a hash collision, indicating more serious problems with the cryptographic proofs.

If in the nonce, the verifying system will extract the hash value (or indeed, the message itself) from the nonce OCTET STRING and possibly the algorithm choice as well, or it may infer it from other parts of the OCSP response. Having found and equated the message or its representation with the message at issue, the system concludes that the message existed at time t and therefore one could reasonably conclude that the message was sent or received (depending on the information stamped) close to that time as well. The system may then generate indicia pursuant to this conclusion, such as those in FIG. 5C.

The OCSP responses, although not literally served as TSAs, are nevertheless reliable and admissible into evidence in broad ranges of circumstances. Under the Rules of Federal Evidence, for example, such OCSP response records are partially hearsay and partially non-hearsay. First, they are relevant to the issue of the message's existence, because the presence of the cryptographic hash value inside the response, coupled with the producedAt and thisUpdate time stamps, tends to show that the message existed by those times. The truth at issue is whether the requester was in possession of a message at the time. Though the nonce may literally indicate "the message is NOT the hash 01234567," if 01234567 can be shown as only originating from the message digest function that shows it to be unique with respect to the message with a high degree of probability, the mere existence of 01234567 tends to prove that the message corresponding to 01234567 existed, and that 01234567 is the hash of that message.

Nevertheless, the existence of the complete OCSP response is hearsay, because the OCSP response claims to be generated a particular time and therefore must be offered for the truth of that matter declared therein. Yet the OCSP response may be a record of regularly conducted activity, and therefore may fall under the "business record exception" to the general rule that hearsay is inadmissible. The OCSP response is a report, record, or data compilation of acts ("someone made a request"), events ("someone made a request"), conditions ("certificate associated with ID is or is not revoked, or is unknown"), and opinions ("certificate is revoked due to alleged non-compliance with CA policies"), made at the time from information transmitted by a person with knowledge (i.e., the CA as a reliable organizational entity), kept in the course of a regularly conducted business activity (providing certificate status and signing each response with a private key that is kept under the control of the CA via the OCSP responder).

For an OCSP responder under the control of a CA to repudiate the purported truth that the response was generated at that time, the CA would have to deny that it (through its mechanical agent, the OCSP responder) signed the record, or that it failed to keep accurate track of time at least at one point during the OCSP's lifetime. But a reliable CA that maintains a reliable OCSP service would not be able to repudiate these propositions, without also repudiating the trustworthiness of all other responses that the OCSP has made. Such a repudiation, though possible, could violate its Certification Practices Statement (CPS) and therefore would cause the CA to go out of compliance with the declarations made to and approved by its auditors (such as WebTrust). Furthermore, the requester may elicit additional corroboration by requesting the OCSP server for status of certificate IDs actually in existence and known generally to be "good" or "revoked" (as opposed to "unknown"). The response of the OCSP server "good" for a certificate actually issued and active, would be probative that the OCSP server's response was generated during a "good" period of the certificate, bounded at least on the early end by the time at which the actual certificate was issued. Certificate expiration and archive cutoff dates may assist in bounding the later time as further corroborating evidence. Furthermore, a CA generally must keep and maintain accurate time with respect to the dates of issuance and expiration in certificates that they issue, in order to be reasonably reliable, to comply with its own CPS, and to retain the approval of its auditors (such as WebTrust).

The embodiments may also remember that the user viewed and implicitly trusted the message while the message is otherwise known to be trustworthy. For example, a system may store such information as a preference, for example, in a preference database on the computer on which the system runs. The system (on behalf of the user) can procure a cryptographic time stamp from a third-party TSA and associate that time stamp with the message.

Reference will now be made in detail to the exemplary embodiments of the invention, which are illustrated in the accompanying drawings. Wherever possible, the same reference numbers will be used throughout the drawings to refer to the same or like parts.

In general, FIG. 1 shows an exemplary system. FIG. 1 shows an exemplary system consistent with embodiments of the present invention. FIG. 1 is intended as an example, and not as an architectural limitation for the embodiments described. As shown, a system 100 may comprise a network 102, a user computer 104, a messaging server 106, a CA server 108, and a sender computer 110 that is operated by a sender. These components will now be further described below. System 100 may include, however, additional servers, clients, and other devices not shown.

Network 102 serves as a communication infrastructure to support the communications between the other components of system 100, such as user 104, messaging server 106, and CA server 108. Such networks are well known to those skilled in the art including local area networks, metropolitan area networks, wide area networks, mobile communications networks (such as 3G networks), WiFi networks, and the like. In some embodiments, network 102 may comprise one or more networks of the Internet.

User computer 104 provides the hardware and software for a user to utilize the methods and systems of the embodiments. The user computer 104 may be implemented on well known devices, such as, personal computers, network computers, mobile phones, laptops, and the like. In the depicted example, user computer 104 may comprise the hardware, software and data (not shown), such as processors, memory, storage systems, boot files, operating system images, and applications (like a browser and browser extension). Furthermore, the user computer 104 may employ the Transmission Control Protocol/Internet Protocol (TCP/IP) suite of protocols to communicate with the other components of system 100.

Messaging server 106 provides services, for example, to user 104 related to messaging. For example, messaging server 106 may be one or more servers that implement an e-mail application. Such servers are well known to those skilled in the art. Of course, messaging server 106 may provide other services, such as account management, or other forms of messaging. In some embodiments, messaging server 106 may relate to well known e-mail services, such as Microsoft Exchange, or webmail services, such as Yahoo! Mail, Gmail, and the like.

In the depicted example, messaging server 106 may comprise the hardware, software and data (not shown), such as processors, memory, storage systems, boot files, operating system images, and applications (like a web server). Furthermore, the messaging server 106 may employ the TCP/IP suite of protocols to communicate with the other components of system 100.

CA server 108 can serve as a third party that is trusted by both the user computer 104 and other entities of system 100, such as the sender, sender computer 110, etc. For example, user computer 104 and sender computer 110 may rely on the CA server 108 for attestations of particular kinds, for example, confirming each computer's identity and providing public keys of each computer, but not necessarily the user or the sender. In general, the CA server 108 confirms that each computer is in fact who they say they are and then provides the public keys of each computer to the other. In some embodiments, the CA server 108 provides digital certificates and a PKI system that allows the user computer 104 and messaging server 106 to secure his or her messaging. For example, in some embodiments, the services of CA server 108 may enable the use of S/MIME by user 104 with a webmail application provided by messaging server 106.

In the depicted example, CA server 108 may comprise the hardware, software and data (not shown), such as processors, memory, storage systems, boot files, operating system images, and applications (like a web server). Furthermore, the CA server 108 may employ the TCP/IP suite of protocols to communicate with the other components of system 100.

Sender computer 104 provides the hardware and software for a sender to utilize the methods and systems of the embodiments. The sender computer 110 may be implemented on well known devices, such as, personal computers, network computers, mobile phones, laptops, and the like. In the depicted example, user computer 110 may comprise the hardware, software and data (not shown), such as processors, memory, storage systems, boot files, operating system images, and applications (like a browser and browser extension). Furthermore, the user computer 104 may employ the Transmission Control Protocol/Internet Protocol (TCP/IP) suite of protocols to communicate with the other components of system 100.

FIG. 2A-B shows certificates from two different providers, with different formats for similar types of information. One skilled in the art will recognize that other formats of certificates may be utilized and analyzed by the embodiments in order to determine the trustworthiness or reliability of a message.

Figure 3:
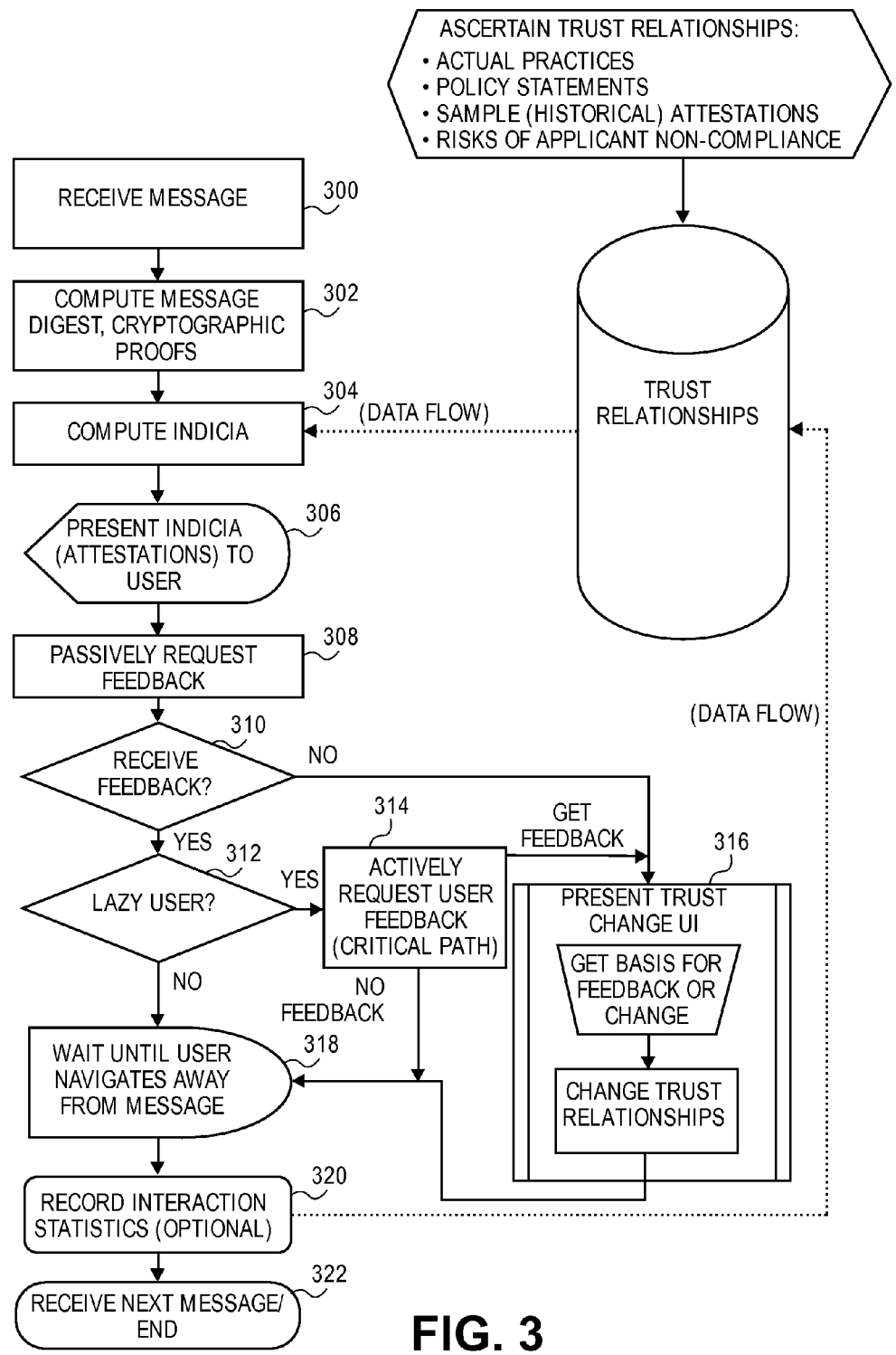
FIG. 3 shows algorithm and data flow for an exemplary embodiment of the system described herein.

FIG. 3 shows an exemplary algorithm and data flow for an exemplary embodiment of the system described. In stage 300, a message is received. For example, when a user employs an e-mail client, such as Outlook, user computer 104 may receive the message. Alternatively, when the user employs webmail or some other form of messaging, messaging server 106 may be the device that receives the message initially.

In stage 302, in one embodiment, a message digest and various cryptographic proofs are computed. In stage 304, various indicia about the message are then determined.

In stage 306, the indicia about the message are composed into a statement that is intended to be easy to understand by the user, such as, plain language statement, or a plain language active voice grammar statement. Such statements are illustrated in the figures. Although the examples in the figures are shown in English, one skilled in the art will recognize that the embodiments can present the indicia in any language statement.

In stage 308, feedback may be passively requested from the user. This feedback may be used to modify the indicia, for example, in changing the indicia from a third-party attestation to a first-party attestation by the user. In addition, the request for feedback may be presented using different types of user interface elements and may employ other features, such as an automatic timeout.

In stage 310, if feedback is not received, then processing may flow to stage 312. Otherwise, the processing may flow to stage 316. In stage 312, it is determined whether the user is being non-responsive, e.g., a "lazy" user. If the user is being "lazy" or otherwise non-responsive, the embodiments may resort to a more active user interface in order to solicit feedback from the user, such as a popup window. If feedback is actually received, then processing may flow to stage 316 where the feedback is used to modify the indicia and the various trust relationships may be modified as well.

If the user is not being "lazy" or when feedback is received, then processing may flow to stage 318 where the user computer 104 or the messaging server 106 waits for the user to navigate away from the message. For example, the user may select another message or may return to a list view of the messages.

In stage 320, the user computer 104 or the messaging server 106 may (optionally) record statistics about the user's feedback, the indicia, and the various trust relationships. In stage 322, the system 100 may proceed to the processing for the next message.

Figure 4:
FIG. 4 shows a sample message display with computed indicia.

FIG. 4 shows a sample message display with the system's computed indicia. As shown, underlined text generally indicates a hyperlink or otherwise interactive text object. When activated, the text may cause the user's computer 104 to bring up information on the information underlined information or causes the user computer 104 to respond with further processing.

In FIG. 4, an information bar is shown appearing above a message. In the example, shown, the information bar contains indicia based on the ascertained trust relationships. These relationships may be reliant upon certification relationships established through the PKI and analyzed by the system 100, such as by messaging server 106. In another embodiment, the trust relationships are arrived at through certification relationships established through cryptographic webs of trust and analyzed by the system 100.

As shown, a message 400 comprises a header portion 402 and message body 404 of content. In addition, a message 406 is shown as part of message 400 that includes indicia about the trust relationships and may include user interface elements to modify the indicia regarding the trust relationship, such as "I trust it", "I don't trust it", "More info", etc.

FIGS. 5A-F show variations of indicia that can be produced by the system 100 when a message is displayed on the user computer 104. As shown, double underlined text generally serves the same function as underlined text, except that double underlined text distinguishes otherwise ambiguous indicia, such as a family name versus a given name. When clicked upon, the user computer 104 may bring up explanations of what actually happened in the transmission of the message or what the text means in context.

In particular, FIG. 5A shows variations in the verbiage of plain language statements that may be employed in the embodiments. FIG. 5B shows time stamps and multiple attesters. FIG. 5C shows how information may be detailed or abbreviated. FIG. 5D shows an expired certificate with otherwise valid cryptographic proofs. FIG. 5E shows message digest failures: in the case of a digest failure, an exemplary embodiment may be configured to display no further indicia as a precaution and warning to the user. FIG. 5F shows indicia where the certificate has been revoked under various time-dependent circumstances. Thus, as shown in FIGS. 5A-F, many variations on the content of the indicia are possible.

Initially, in system 100, content of the indicia can be taken from the corresponding digital certificates. System 100 may ascertain several types of information for the indicia including:

1. The entity or entities asserting the basis for trust;
2. The status of the sender, whether a person or a corporation;
3. The name of the sender in that name's particular permutations;
4. The affiliation of the sender;

5. The messaging address;
6. The location; and
7. The most recent status of the trust relationship-possibly added after the user's first impression of the indicia through "lazy updating"
8. Information that indicate opportunities for a user to change the trust relationship.

Referring now to FIG. 5B and FIG. 5F, it may be a feature of the some embodiment that the system need not rely exclusively on a third-party TSA for time stamping information. If the system 100 relies on the receiving server (i.e., messaging server 106), for example, the system 100 indicates that the receiving server is the basis for the time assertion. The user may rely on this time to the extent that the user believes that the receiving server 106 is trustworthy.

Figure 6A:
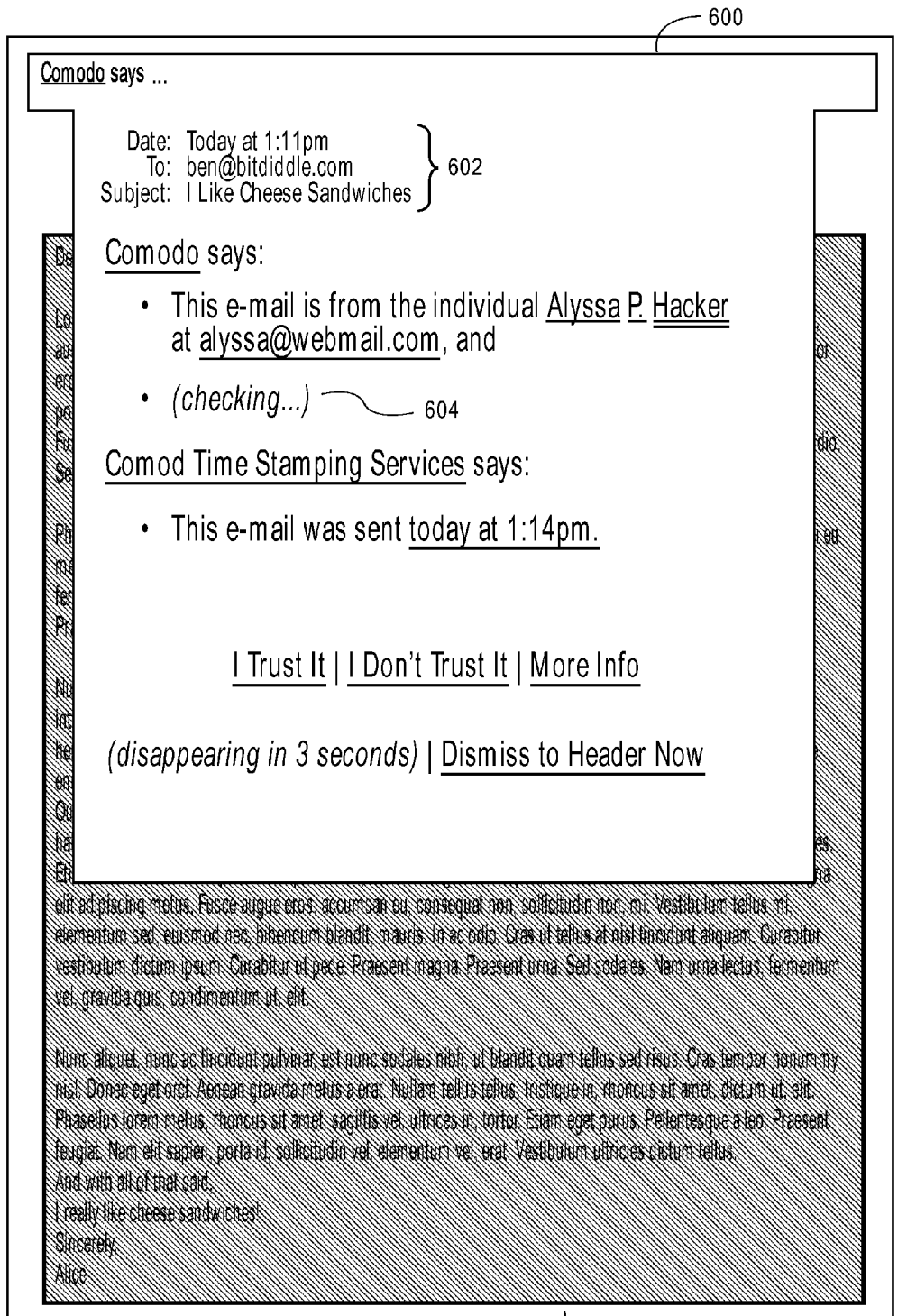

FIGS. 6A-B show the prominent displays of progressively updated indicia. These displays may be used, for example, to attempt to train the user to pay attention to the security and trust levels displayed. A feature of the indicia indicated above is the presentation of the entity attesting the basis for trust to the user, and as shown in FIG. 6, presenting the entity to the user prominently (i.e., so that the user sees it at first glance).

In certain embodiments, presenting this attesting entity can have several benefits. The user may be able to rely upon the attesting entity directly. The attesting entity can become known and recognizable to increasing numbers of users. The attesting entity may have more value, such as reputational value.

In an alternative embodiment, the information bar's information is consolidated into one or more headers of the message. Because the user may ignore the details of the From: line, in an exemplary embodiment, the system 100 may include user interface elements, such as those of FIG. 4, to make indicia prominent. However, FIG. 7A-C show indicia that are consolidated into a From line in accordance with some embodiments of the present disclosure.

In one embodiment, the system 100 attempts to train the user to pay attention to the security and trust levels displayed. The system 100 may, for example, withhold displaying the bulk of a message from being displayed as shown in FIG. 6A, or catches the user's eye with a visual display (such as a pop-up window) that later disappears or minimizes, revealing the message. During the waiting period, the user thus has an opportunity to read the indicia.

In one embodiment, the user is required to respond. Alternatively, the user may be allowed to passively wait and a short timeout or pre-programmed animation sequence dismisses the display of the indicia.

Figure 8:
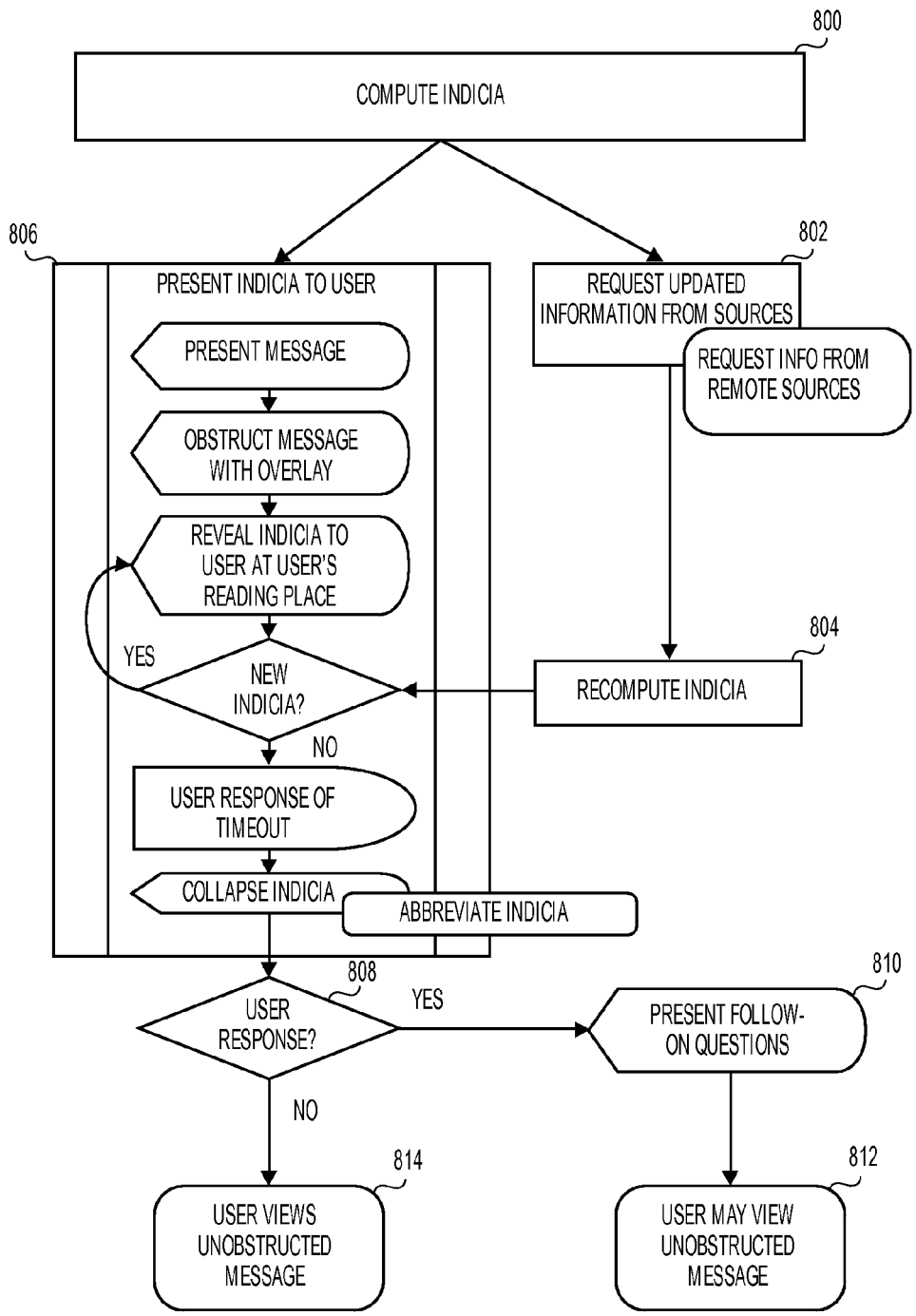
FIG. 8 is an exemplary flowchart of the animated displays shown in FIGS. 6A-B.

Furthermore, the system 100 may gather additional information to compute updated indicia, such as time stamp or revocation information. Such visual displays may gradually reduce in intensity or intrusiveness over time. A flowchart of such an animated display is shown in FIG. 8.

As can be seen in the figures, such as FIGS. 6A-B, the information presented by the information bar can be featured prominently in the message space. Further visual indicators may be used to distinguish between the system 100's overlay (which is trustworthy) and the message content (which the user evaluates). For example, the indicia may be framed in a box that the message content cannot disable. In such an embodiment, only the system 100's overlay is considered trustworthy and permitted to break the box's boundary. For example, as shown in FIGS. 6A-B, an overlay 600 is considered trustworthy and may present various indicia for evaluation by the user.

Furthermore, values that are not cryptographically bound to the sender, such as unverified message headers (such as RFC 2822 headers) may be separated or distinguished from cryptographically bound data, as indicated in FIG. 4. As shown in FIG. 4, the headers 402 may include information, such as the date, To, From, and Subject of a message.

As shown in FIGS. 6A-B, the non-bound values (as indicated by box 400) are distinguished by being obscured, that is not shown, blacked out, covered over. For purposes of illustration, FIGS. 6A-B show a grey out portion to illustrate those portions being obscured. This is not how it would actually be displayed.

FIG. 8 is a flowchart of the animated displays shown in FIG. 6A-B and is described herein. In stage 800, a message's indicia are computer or determined, for example, by messaging server 106 or user computer 104. In stage 802, the system 100 requests updated information from various sources, such as CA server 108. In stage 804, the system 100 may then recomputed or modify the indicia of the message based on this information. Meanwhile, in stage 806, the user computer 104 or messaging server 106 may present the indicia to the user. For example, if the user is employing an e-mail client, such as Outlook, then the user computer 104 may present the indicia to the user. Alternatively, if the user is employing webmail, then the messaging server 106 may present the indicia to the user via a browser running on the user computer 104.

In presenting the indicia, various user interface elements may be employed. For example, the indicia may be presented in an overlay, such as illustrated in FIGS. 6A-B. The indicia may be revealed at various speeds in order allow the user to read and understand the indicia. New indicia may also be presented during this stage of processing.

In some embodiments, the overlay is controlled via a timeout and may automatically recede from the display or collapse. In some embodiments, an abbreviated indicia may remain for display to the user.

In stage 808, the user may be prompted to a response, for example, to modify the indicia as illustrated in the figures, such as FIGS. 10A-C. If the user provides a response, then, in stage 810, follow up questions may be presented, as needed. In stage 812, the user may then view the message unobstructed.

If the user does not provide a response, then, in stage 814, the user may still be allowed to proceed to an unobstructed view of the message. This transition may be allowed, for example, after a timeout period.

As shown in FIGS. 10A-C, embodiments allow and encourage users to convert to first person attestation from third-party attestations, i.e., adopting a statement about a message or sender or making your own statement about a message or sender. There is a difference between what the user trusts now and what the system has available to it based on what the user recorded in the past. Therefore, the system has to overcome this inertia in what the user thinks or trusts now. Embodiments may thus try to have users to stop trusting this idea and utilizing the software of the embodiments.

FIG. 10A-C show indicia, sample user actions, system responses, and user interfaces presented when the user attempts to evolve trust relationships. In particular, FIG. 10A presents a flow for an individual, leading to the user concluding that aspects of the attestations are reliable or accurate for the purposes for which they were offered resulting in an increase in trust. FIG. 10B presents a flow for a company, leading to the user concluding that aspects of the attestations are reliable or accurate for the purposes for which they were offered resulting in an increase in trust. FIG. 10C presents a flow for a company (and for the CA at issue), leading to the user concluding that aspects of the attestations are reliable or accurate for the purposes for which they were offered resulting in a decrease in trust.

FIG. 9A-B show indicia for untrusted self-signed certificates and authorities. Embodiment may handle self-signed certificates and their implications in various ways. Self signed certificates are easy to generate, because they require no third-party verification but information in them is easily forgeable. An embodiment of the present system recognizes that a malicious sender, such as a spammer or phisher, could create a self-signed certificate with incorrect information. A malicious sender could also forge a certificate authority and cause untrustworthy digital certificates to be signed on such a CA's behalf.

In some embodiments, the indicia for a self-signed entity, if it were to appear at all, may appear without any adornments as illustrated in FIG. 9A. Indicia displayed by an embodiment of the present system are also shown in FIG. 9B. Thus, an advantage of the embodiments even a user having little experience with cryptography, PKI, or webs of trust may easily adopt and understand the features of system 100.

As shown in FIG. 9B, the system 100 can support attestations by the user without any independent attestations or information from other sources based on the user's personal evaluation or knowledge. Hence, the user can still elect to trust a self-signed cert. However, the embodiments do not allow user to blindly trust messages. In some embodiments, even if there are no reliable attesters who are attesting to any aspect of this message that is relevant to authenticating the message, the user or user computer 104 may still make some evaluation of the trustworthiness based on, for example, on how the sender signed the message or by analyzing other cryptographic information derived from the message, such as a SHA-1 fingerprint.

Figure 16A:
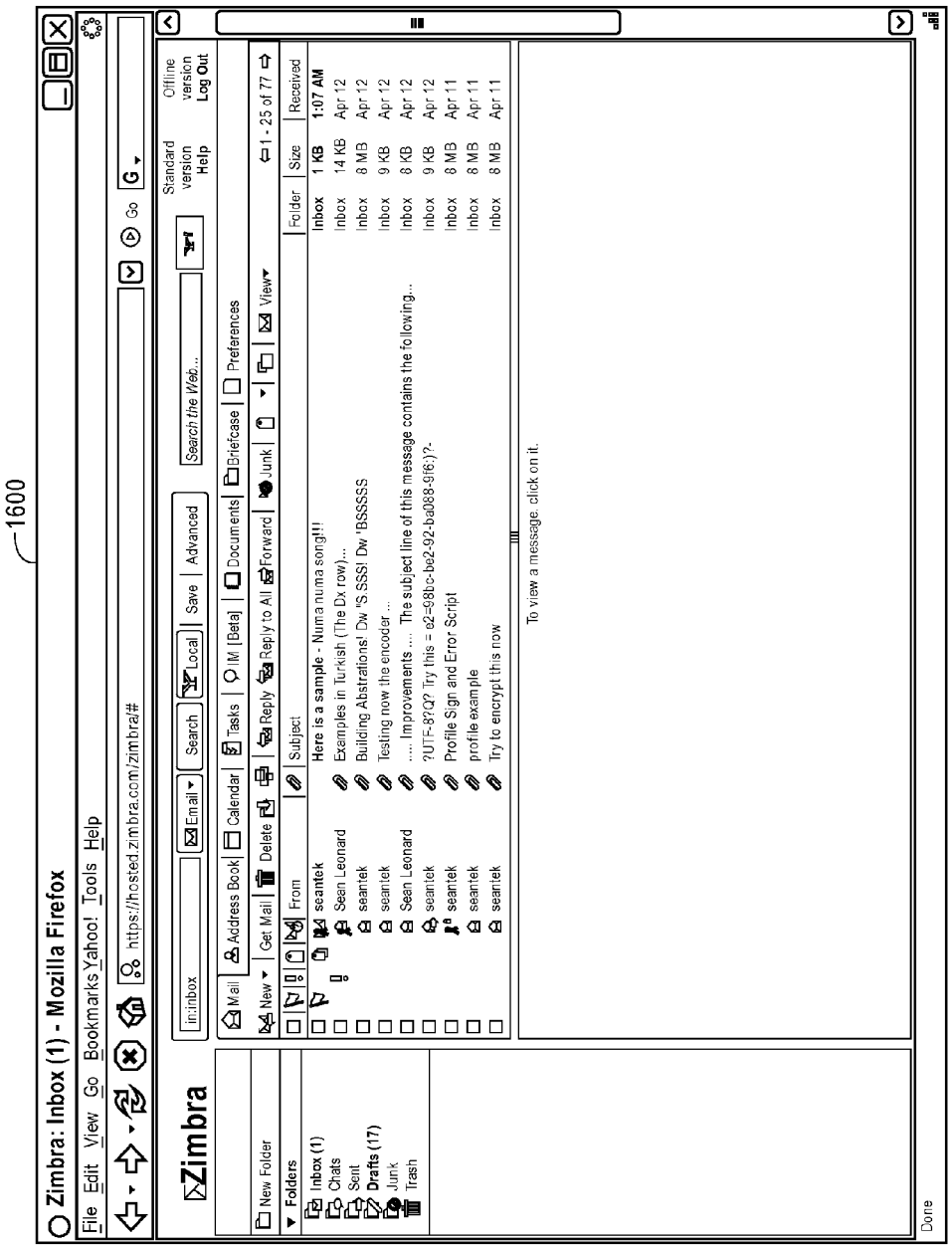
FIGS. 16A-B show an exemplary list view indicating trustworthiness of messages.
Figure 16B:
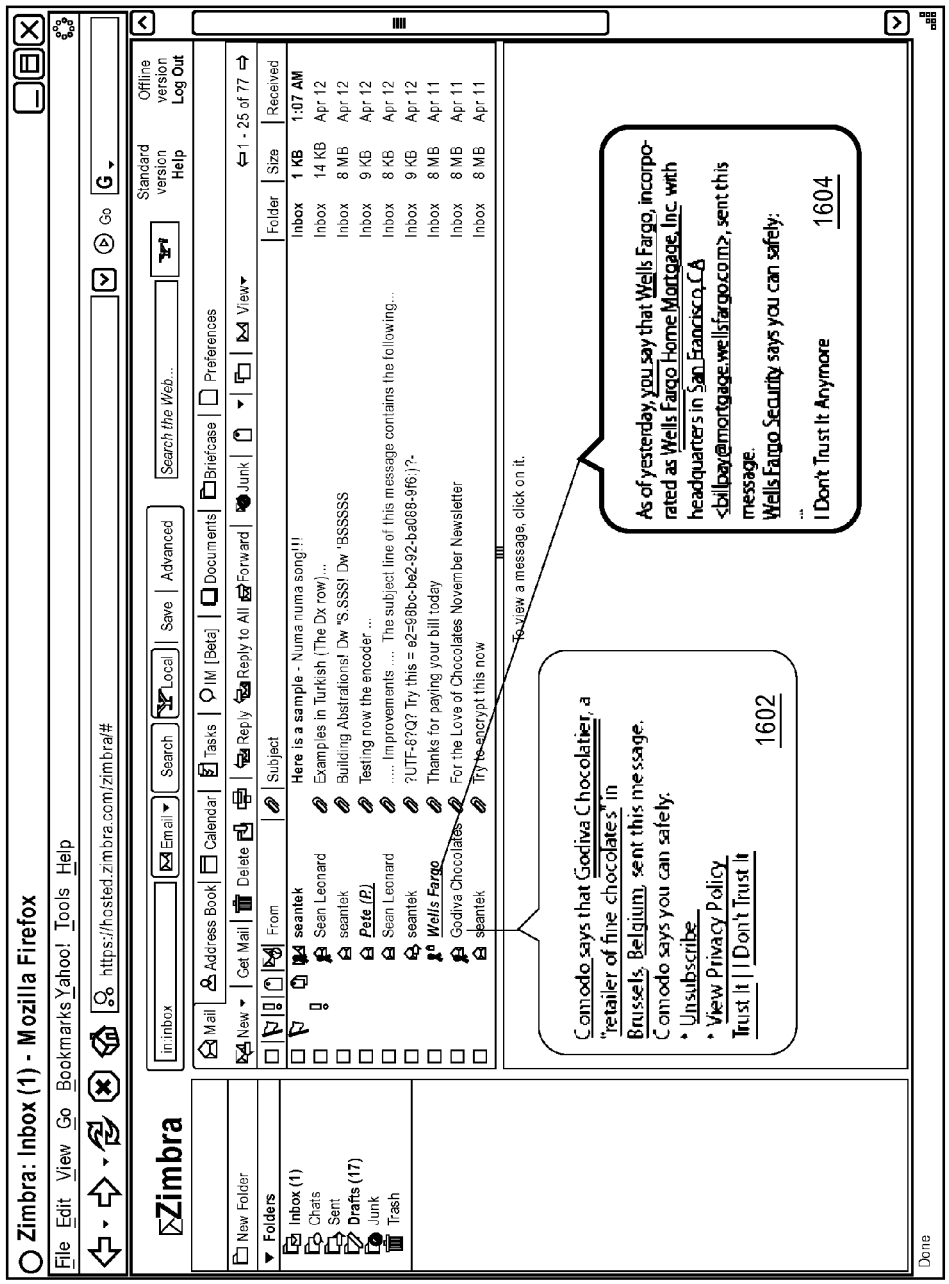
Figure 17B:
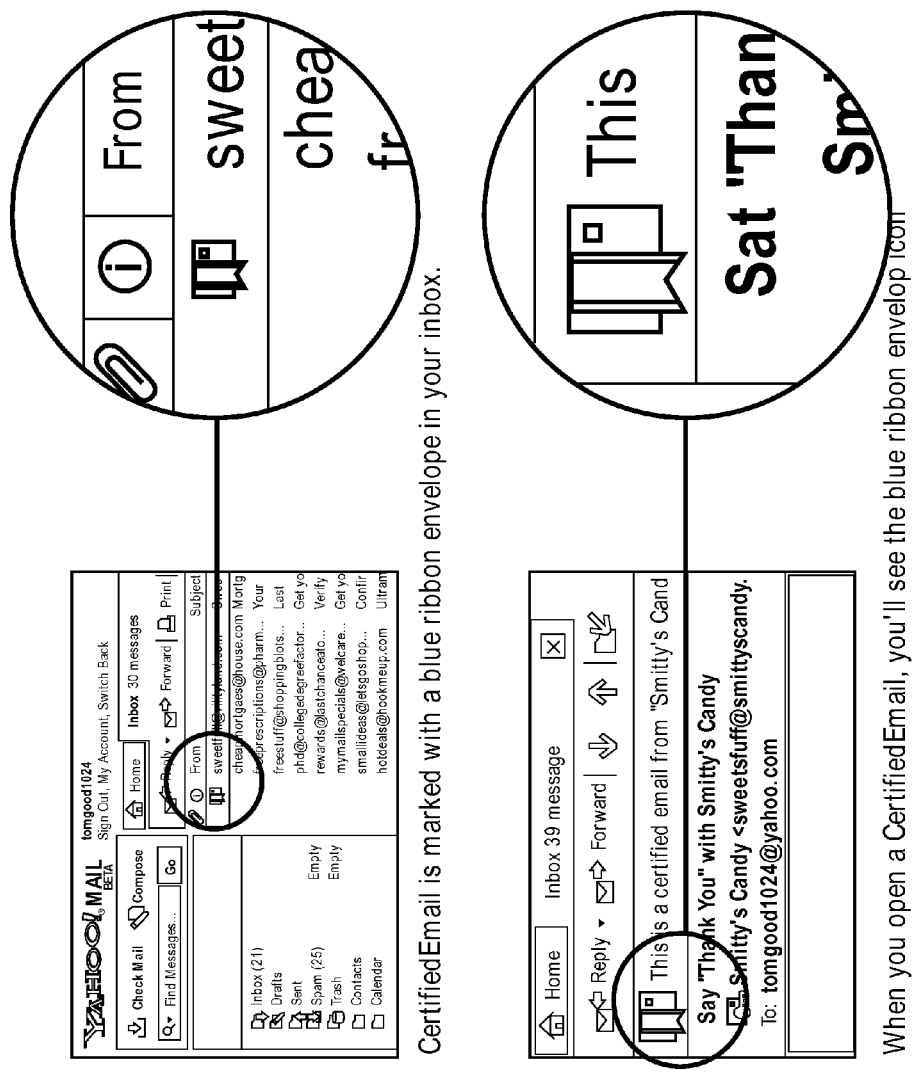

FIG. 11 shows exemplary indicia that communicate expressed changes in trust, whether from the user or from another attesting entity. FIG. 12 shows the resolution of colliding indicia by some embodiments. FIG. 13 shows another example of resolving colliding indicia by some embodiments. FIG. 14 shows another example of resolving colliding indicia by some embodiments. FIG. 15A-C show the resolution of the trustworthiness of message with various signature patterns, such as, when unsigned messages appear after a stream of signed messages. FIG. 15D shows an exemplary user prompt that is displayed to show colliding indicia despite successful resolution of the sender's indicia. FIGS. 16A-B show an exemplary list view indicating trustworthiness of messages. FIGS. 17A-B show the user interface of a known system.

Figure 20:
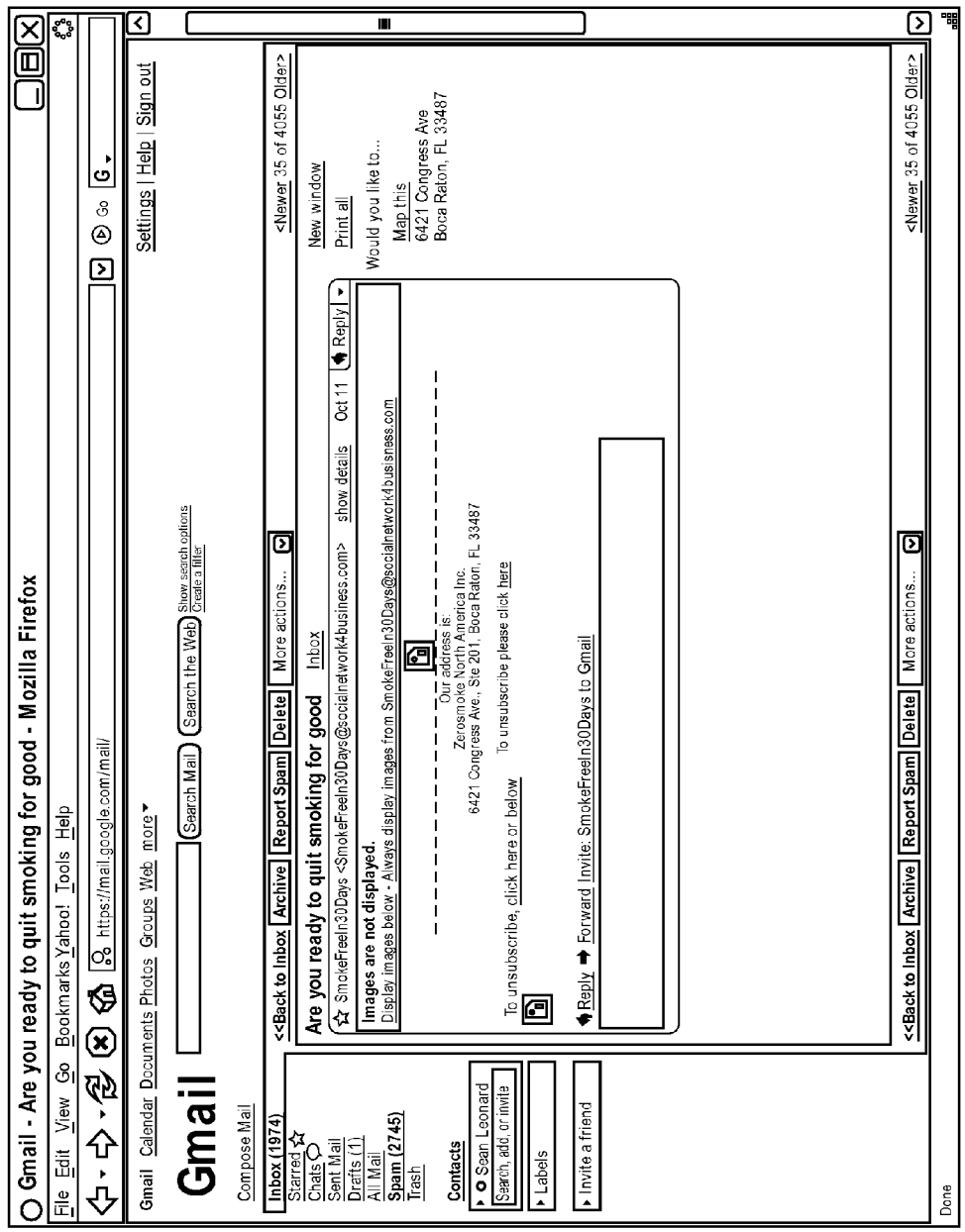
FIG. 20 shows a conventional webmail interface with a "Report Spam" button.

FIG. 18 shows an exemplary digital certificate and information related to the role of the sender. FIG. 19 shows a sample indicia based on the digital certificate shown in FIG. 18. FIG. 20 shows a known webmail interface with a "Report Spam" button.

FIG. 21 shows indicia, user actions, system responses, and user interfaces when the user attempts to assert a decrease in a role-based (marketing) trust relationship. FIG. 22A-B show indicia, particularly regarding images and links, according to role based policies described herein.

Having described various embodiments of the way that the system establishes initial levels of trust, such as illustrated FIG. 4 through FIG. 9, the embodiments may further assist a user modify such levels of trust over time. Links or other indicia may prompt the user to elevate or lower the user's sense of trust in the proffered propositions. When a user indicates that he or she wishes to further the trust relationship, the user is presented with an interface, such as FIG. 10A, that permits the user to annotate specific details about the sender. The user may confirm, deny, or express no preference about individual pieces of information. Optionally, the user may add such details to the user's address book, or otherwise bind the annotated certificate to an already-existing address book entry. Optionally, the system digitally signs such annotated details with the user's private key.

A user may view a message many times, but the mere viewing of a message does not indicate that the user trusts the sender or the particular message any more or less. For example, a sender may be a spambot with a legitimately-acquired certificate bearing the spambot's e-mail address. A sender may be a friend of the user whose computer and private key were recently and unfortunately compromised.

Accordingly, some embodiments may disambiguate or distinguish messages that (A) claim that the message is from a sender versus (B) a claim that the message is from someone who holds the private key of a sender. In these embodiments, the system 100 may consider the number of times that a user views certain messages, but may tend to place greater weight on positive assertions that the user makes respecting the user's trust levels.

The system 100, such as messaging server 106 or some other component (not shown) may monitor the user's reading (including length of time to read) and therefore implied acceptance of messages from a sender who consistently presents the same digital certificate. After the user reads a few such messages without indicating a trust decision, the system 100 may prompt the user to indicate whether he or she trusts the certificate consistently used by that sender.

Furthermore, some messages may be known to be suspicious because, for example, messages in which: a content-based heuristic reports a high suspicion score, the certificate is self-signed, or the message does not match historical expectations as detected and displayed using techniques enumerated below. The system 100 can affirmatively ask a user whether the user trusts the message (A) while the user reads the message, such as asking passively in the information bar, and (B) after the user reads the message, such as asking actively using a user interface such as a popup prompt or window.

Moreover, the system 100 can record the times at which the user changes his or her trust relationships. As shown in FIG. 11, such times may be used as indicia in future messages. Such indicia may be buttressed with further time-based indicia from attesters. For example, CAs may offer update services, such as certificate revocation lists and online certificate status protocol servers, to warn of the trustworthiness of particular underlying certificates.

The user may affirm a trust relationship while failing to enter or affirm much personal data, as a typical user might do to dismiss a modal dialog quickly without reading it. A modal dialog is a known a user interface element, such as small window, that blocks the user from interacting with the rest of an application, such as a mail client software application. Thus, a user might approve of only the e-mail address. In such a case, the system 100 can prompt the user to enter more data after the user passively reads more messages from the same trusted sender. At this prompt, the system 100 may then suggest data that is unverified (such as the name consistently presented in the unverified From line) in the absence of attested information from another source. This may be useful, for example, for permitting the user to approve of the additional data without providing much extra information in most cases.

In a further embodiment, the presence and recall of consistent historical digital signature information assists in distinguishing attacks with differing or absent signature information. Certain embodiments of the system 100's user interface elements raise the possibility that indicia may collide for two distinct sending entities. As noted, FIGS. 12-16 show examples of such situations.

For example, two valid and trustworthy senders may have the same or strikingly similar indicia: "Liz Carlson" at "CompanyCorp" (in California) <liz@companycorp.com> and "Liz Carlson" at "CompanyCorp" (in Delaware) <liz@companycorp.biz>, where neither company has provided sufficient information to a CA regarding the location of said corporation. As another example, an untrustworthy sender may be attempting to impersonate a trustworthy sender: "Liz Carlson" <liz@hotmail.com> attempts to impersonate "Liz Carlson" <liz@companycorp.com>. An untrustworthy sender may impersonate a trustworthy sender, but with a different, self-signed digital certificate. An untrustworthy sender may impersonate a trustworthy sender, but with a certificate signed by a CA that the system treats as trustworthy or generally reliable for the purpose of identifying the email addresses and first name and last name of various senders. An untrustworthy sender may impersonate a trustworthy sender without signing the message. As noted, indicia documenting collisions and anomalies are presented in FIG. 12. Close cases may be decided by system 100 by employing algorithms that identify homograph attacks, such as algorithms proposed for the analysis of confusingly similar domain names.

The trust relationships inherent in the techniques of the system 100 may prevent colliding indicia from being displayed. Most colliding indicia may generally not occur because the system 100 previously ascertains that a trustworthy or reliable CA would not issue a certificate to the untrustworthy sender without verifying the underlying e-mail address or other indicia. Nevertheless, colliding indicia may occur, for example, when an e-mail address changes hands, such as after the underlying domain name changes owners while the sender's certificate for the old address remains unexpired.

In an exemplary embodiment, the system receives a legitimate updated certificate from the sender, and automatically updates the system's trust history with the new certificate. Examples in the art of proving such legitimacy include countersigning the signed message or wrapping the signed message in another signed message. The countersignature or outer signature is generated by the old private key; the original signature or inner signature is generated by the new private key. Some embodiments verify the data generated from cross-signing the new key with the old key and vice-versa, or dual-signing a message that specifically identifies all and only the equivalent keys, to avoid certain types of attacks such as the "unwanted identity aggregation attack." In such an attack, the new key holder signs the old certificate (or other form of data including the old key), but the identity of the old key holder is different from the identity of the new key holder, and therefore the old key holder does not want or accept the purported equivalence claim that the new key holder is making. Further embodiments of the system 100 can accept attestations from any attester, such as from CAs, not just the sender of the message. The system optionally presents a notification regarding such updating, as shown in FIG. 13, which further serves to notify the user of the change so that he or she may reject the change if the old private key is believed to be compromised.

In the absence of such a legitimate update, the trustworthy and untrustworthy senders differ in their keys in this case. Thus, an exemplary solution used by the embodiments is shown in FIG. 14.

A solution for colliding indicia is shown in FIG. 15A-C. The system presents a history regarding the signing patterns of the trustworthy sender. The system presents the message after a short delay so that the user may read the warning (FIG. 15A) without getting progressively annoyed by needing to dismiss the warning. If the user clicks on the "Ask Identity Privately" link, the link causes the system to compose a signed (if possible or desired) and optionally encrypted message.

FIG. 15A illustrates selected indicia and requests in a class of attacks known as unsigned message attacks. In such an attack, an attacker sends a message with a forged From: address, but without an accompanying digital signature.

In the case of an RFC 2822 e-mail, a From address comprises a list of Mailboxes; each Mailbox is defined by an e-mail address (addr-spec) and optional display name. The literal forged From: address (e.g., addr-spec) may be meant to induce a recipient to believe that the message is really sent from a person who has indicia (such as a personal name or trademark) that looks like that address, even if the optional display name is excised or not displayed. Furthermore, the From: address may be literally accurate, but nevertheless misleading, such as "lizcarlson@gmail.com." This attack may further confound the recipient if the content of the message indicates that the sender. Finally, the From: address may be literally accurate because the attacker gained access to the sender's account, or breached the internal network of the mail provider that the sender uses at any point (thus confounding the relaying mail servers since the message is originating from the known mail servers according to various records, such as SPF or DNS).

In FIG. 15A, the system computes indicia as a consequence of detecting the signed message attack. Optionally, indicia specifically indicate the nature of the attack, namely, that the absence of a signature is probative of the sender's identity as concluded from an aspect of the sender's behavior. The behavior is that, when associated with particular indicia, the system has come to expect the presence of a valid digital signature and specifically a digital signature from particular keys. This aspect of behavior is similar to the behavioral attestation that when the entity presented as the indicia "Bank of America" signs messages, that entity always signs with a particular key, as illustrated in FIGS. 13-14 and the foregoing description.

The behavioral aspect may be concluded from the various attestations and conclusions in the trust history. In one embodiment, the behavior is ascertained from patterns and practices of the sender, such as shown at the top of FIG. 15A ("usually sends"). In another embodiment, the entity may itself sign an attestation that certain of its indicia (as shown in the bottom of FIG. 15A, the e-mail addr-spec "news@bofa.com" or the name "Bank of America," in either part) always come with accompanying digital signature information; such information may be placed as part of the message such as in the signed attributes of the PKCS #7 or CMS structure of the signed message, or can be provided as field values, such as MIME content header fields, that are signed. Alternatively, the values may be extracted through "page scraping" techniques directly from the message, i.e., the literal text "I, Bank of America, declare that all messages from news@bofa.com or purporting to be Bank of America shall be digitally signed."

In a further embodiment, attesters such as CAs insert this behavioral declaration as part of their general attestations regarding the sender, such as in the data structures of an X.509 digital certificate. CAs may insert this behavioral declaration with respect to certain roles and classes of senders and messages, where such roles and classes are described further below. It is a feature of the present embodiment that CAs attest to certain behavioral characteristics such as the behavior of always expecting that messages related to certain indicia are signed. By making the attestations respecting the behavior not vary with the sent messages, such features tend to work to constrain the behavior of senders, for the benefit of users. Hence, a user concerned about privacy or authenticity may easily prevent the confusing display of messages that are not signed or that bear various kinds of unreliable attestations.

In all such cases, the embodiments of the system may consider these declarations as portions of the system's policy, providing rewards and penalties with respect to the indicia and the content of the message, as discussed further below. Embodiments of the system may ascertain these declarations as part of the initial trust relationships (such as shown in FIG. 3), "pre-seeding" the history appropriately. Furthermore, embodiments of the system may obtain these declarations at an appropriate time via various methods known in the art, e.g., by accessing a remote server in the first stages of starting the system, downloading the declarations, and the like.

The system 100 may automatically include text similar to FIG. 15B containing a nonce. Upon receiving the first response containing the code, the system 100 presents indicia such as FIG. 15C. Yet if the response is very old, the system 100 may present indicia indicating that the reply may be less trustworthy because the risk of interception by a third party (for example, by breaking into the other party's mailbox) increases. The system 100 can remember this association between the user's request, the code, and the first reply, so that the code may not be replayed or otherwise reused.

Furthermore, it is a feature of the system that the user may tell senders with otherwise matching indicia apart through the use of distinguishing annotations. Annotations include, for example, colors, sounds, nicknames, pictures, text, or the display of keying information (for technical users), as shown in FIG. 15B. When a collision occurs, the system 100 can present the user with an opportunity to distinguish the two users, as indicated in FIG. 16.

In a further embodiment, the system may rapidly reconfigure its user interface in response to threats or changing user perceptions, even if CAs do not provide such updates. Key revocation is a known method in the art to prompt others to change their trust relationships. CAs provide certificate revocation lists and online certificate status protocol servers. Nevertheless, the system 100 may periodically download code updates which modify the user interface or the algorithms for computing particular indicia, even if the CA does not directly report such a change via technical channels. For example, the system maintainer may receive notice that a CA's certificate policy statement has changed, and then updates the user interface to reflect the actual trust relationships underlying the changed statement.

In view of the trust relationships bootstrapped and evolved by the system as exemplified above, it is a further feature of the embodiments to distinguish between different types of message senders that have different security profiles and risks. Such profiles and risks are particularly apparent in two classes of messages: mass-marketing messages ("marketing e-mail") and transactional messages ("transactional e-mail"). Marketing messages include newsletters and other matter generally the subject of bulk mail. Transactional messages are sent as status updates for a pending transaction; such messages include invoices, shipment notifications, delivery (or e-delivery) confirmations, and bank statement updates. Both classes of messages rarely require direct replies, but rather induce users to act (such as to buy a product or check the status of an order). Unwanted or fraudulent messages resembling both types are commonly known as "spam" or "phishing schemes."

A system called Goodmail is shown in FIG. 17A-B. As shown, in Goodmail Systems, messages are displayed with a special blue ribbon envelope icon, letting consumers know that the email message is authentic and comes from a verified sender.

However, in one embodiment of the present invention, the system detects indicia in digital certificates in accordance with the system's methods of ascertaining. The system 100 computes such indicia from, for example, information regarding the role or class of the sender, and thus, the classes of messages that the sender is likely to send. The system 100 further computes such indicia from information that is within the CA's ability to certify related to the role or type of the sender. A CA may issue such information, for example, a digital certificate containing this information as shown in FIG. 18.

Turning to specific examples, a digital certificate as shown in FIG. 18 has information signed by the CA. Using the X.509 digital certificate standard, role-based information is indicated in elements of the Distinguished Name (DN) or as data in extensions. Information includes Uniform Resource Indicators (URLs), URL stems, and the identification of fields in signed messages related to personalizing such URL stems. Using data presented in FIG. 18, the system may determine the appropriate per-message fields by reusing the OID values presented in "Role-Specific Information."

For the marketing case, the corresponding digital certificate provides URL stems for (A) Update/Edit Profile and (B) Unsubscribe. The digital certificate provides a complete URL for (C) View Privacy Policy. Personalized values can be provided on a per-message basis, such as in signed attributes of the PKCS #7 or CMS structure of the signed message, or can be provided as field values, such as MIME content header fields, that are signed. Alternatively, the values may be extracted through "page scraping" techniques directly from the message.

For the transactional case, the corresponding digital certificate provides URL stems are provided for (A) Update Account and (B) Track Transaction (or Order). The digital certificate provides a complete URL for (C) View Privacy Policy. Personalized values are provided on a per-message basis, such as in signed attributes of the PKCS #7 or CMS structure of the signed message, or can be provided as field values, such as MIME content header fields, that are signed. Alternatively, the values may be extracted through "page scraping" techniques directly from the message.

Personalized values, referred to above, include values that a marketing or transactional system use to track the identity and status of a message. In e-mail marketing systems known in the art, such personalized values identify the particular message, the particular recipient, and related internal performance characteristics regarding the transmission of the message such as which server the message came from. These personalized values may be obfuscated (for example, hashed or encrypted) to prevent a malicious recipient from performing a substitution attack, such as by manipulating a user identifier to retrieve the profile of another user.

In certain e-mail known in the art, these personalized values are combined into complete URLs that users follow to perform actions, such as unsubscribing. Such URLs are entirely are often provided by a marketing provider or e-mail delivery company, assuming no alteration in transit. Thus, the validity of the URLs depends entirely upon the sender or the e-mail delivery company, and the user must trust such URLs accordingly.

If an attacker compromises the sender's private key, the attacker could send out a seemingly legitimate mass e-mail containing a link that diverts users to a scam or worse. It is a feature of the present embodiment that CAs attest to certain URLs and URL stems by placing such values in their issued digital certificates, while per-message information is placed within the message, attested to (implicitly) by the signer of the message. The system can present a further option to omit the personalized values from composed URLs. Hence, a user concerned about privacy may easily prevent the system from communicating such correlating information to the destination of the URL. FIG. 19 shows sample indicia for the foregoing features. It is a further aspect of the present embodiment that if an attacker attempts an attack on such marketing or transactional messages using techniques such as those described above, then the system 100 can detect the attack.

In an alternative embodiment, if a message contains a certificate update, the system presents the URL patterns in the already-trusted certificate to the user in lieu of the new URL patterns of the new certificate. Furthermore, if the system finds reason to suspect the message is illegitimate, the system 100 can still present the user with valid URLs, but omits the option of submitting personalized values derived from the suspected message.

After viewing a message (and optionally after establishing a trust relationship), the user may change his or her mind about wanting messages from the sender. As FIG. 20 shows, in some extant implementations a "Report Spam" (also known as "This Is Spam") button permits a user to identify the message as spam. While from a marketer's perspective "spam" may mean "unsolicited commercial e-mail," from a user's perspective, "spam" may mean "all unwanted e-mail," even if the user wanted it previously.

Turning now to FIG. 21, for messages where the user has a prior trust relationship (of which marketing e-mails serve as a particular example), the system 100 prompts the user to confirm why the user no longer finds the message or the sender desirable. As discussed above, the system 100 can keep track of changes in the trust relationship so that the system may confront the user with the times of those changes ("yesterday," "last week," or "since Oct. 17, 2007"). FIG. 21 presents prompts from the system and the user's possible responses. "END" marks the end of the interaction, after which the system proceeds to modify the trust relationship or undertake the user's request accordingly.

E-mails known in the art can contain references to any resource, including content outside of the ostensible sender's control. In an exemplary embodiment, the present system enforces a same origin policy with respect to referenced content such as images and links. When a CA (through the bootstrapped trust relationship) or a user (through the evolving trust relationship) attests that it, he, or she has verified the sender's address, the verifier implicitly acknowledges that sub-parts of the address—such as the domain name—are trustworthy. The verifier may make such guarantees explicit via the methods described. In particular, the verifier attests that certain URL stems or patterns will lead to trustworthy resources. The verifier could make a further guarantee that the URL does not divulge personalized information to unscrupulous third parties-suggesting the use of a secured URL such as https. Optionally, the verifier makes yet a further guarantee by providing verified IP addresses associated with such domain names, thereby thwarting a DNS cache attack if the DNS cache were compromised at the time that the images or links were accessed. These attestations may be differentiated for each role ("marketing messages"), and indeed for each sender. Thus, the system restricts verified senders (A) to loading images from the same origin and (B) to referencing links to the same origin.

The system may reward senders for following this policy, or penalize senders for breaking it. An example of a reward is a checkmark or other positive indicia that the message complies with the policy, so that the user does not have to worry about viewing images or clicking links. Examples of penalties include presenting the user with an ominous warning message before following an out-of policy link, removing all such out-of-policy links from the displayed message, and listing all such out-of-policy links in the indicia. Generally, the system 100 may modify the message and the indicia in accordance with the policies for the roles or classes that the message falls including withholding display of the message entirely. The system may also remain silent.

In view of the discussion above, a further embodiment permits images to be loaded without communicating anything more than the user's network address (such as an IP address). In the case of images or other inline-loaded resources ("images"), the CA (or verifier in general) may specify a verified partial-URL stem for images. However, when loading an image, the system further restricts image references in the HTML message to a small set of pre-determined monotonic values, such as 1.jpg, 2.jpg . . . 9.jpg. The system loads those images, and always those images, irrespective of whether particular combinations appear in the message. If no images are in the message, the system may forego loading any images. If the sender were permitted to pick and choose between how many images the sender's message loads, the referenced server could correlate the specific images loaded with different variations of the message. Thus, for maximum security, the system only releases binary information about the resources loaded: all resources or no resources. Another variation permits two classes of resources: images always requested for the sender for which the sender always has an incentive to include in the sender's messages (such as the sender's corporate logo), and "all other images," if present, following the rule above. It may be appreciated by those skilled in the art that even the network address of the recipient or user computer can be hidden via mix networks (such as Tor), firewalls, or proxies.

However, a sender will likely send out many messages over the course of its digital certificate's lifetime. Thus, the system combines the URL stem and the pre-determined image names with a token that uniquely identifies the message class, but that bears little correlating information to a specific user. The message's personalized values, for example, may well contain such correlating information that the system cannot effectively ascertain (and excise) because the information is hidden using stenographic techniques. Examples of correlation-resistant tokens are: (A) the message's received date (time truncated, for example, to the day) according to the user's messaging service, and (B) the message's date (time truncated, for example, to the day) according to a timestamp generated by a third-party TSA, or other values such as those exemplified above, which the sender has no control. Provided that the sender sends n messages per day, the sender will not be able to tell whether a particular recipient downloaded images in that message (and thus opened the message) with more than 1/n certainty. Furthermore, the sender will only be able to segment its bulk list of recipients—for tracking purposes—to the extent that it is willing to stagger delivery of its message to different user classes over several days. The system may add deliberate uncertainty to the date by treating the time zone-dependent received day, without time zone information, as the token. Such uncertainty discourages the sender from segmenting the list into two classes by sending immediately before and immediately after midnight. Thus, in the foregoing embodiment, the system permits the sender to learn of "open rates" and very limited subcategories of recipients, while preserving virtually all of the user's privacy.

In view of the various alternatives above, an exemplary embodiment specifies the following policy and presents the following indicia: (A) for general senders such as individuals: Provide a checkmark and an affirmative statement for a message whose images and links all comply with the same origin policy. Do not provide any indicia for images or links leading to different origins, but warn the user of homograph attacks via an appropriate algorithm if the user attempts to follow a link in the normal course. It is a feature of this embodiment that links sent between acquaintances, such as links to interesting webpages from one friend to another, are not flagged as dangerous merely because they violate the same origin policy. (B) For marketing and transactional messages: Provide a checkmark and an affirmative statement for a message whose images and links all comply with the same origin policy. Automatically load images that comply with the same origin and correlation-resistance policies. Provide an ominous warning if any links or images do not comply with the same origin policy. It is a feature of this embodiment that marketers and transactors ("Senders") gain some additional content-centric benefit to sending signed messages, in addition to the change profile/account, unsubscribe/track, and privacy policy links inherent in the role certificates. It is another feature of this embodiment that Senders are not restricted in "copy" (namely, the formatting or content of the message). It is another feature of this embodiment that the benefits to Senders do not materially impair users' privacy.

Compliance with the system's policy does not necessarily imply that the system will automatically load images. Thus in the sample policy above, the user knows that images and links from a new sender are "safe," but still affirmatively chooses to load the images after seeing the textual content and general layout of the message. When the user feels comfortable with indicating "I Trust It," the user may specify that all images are to be automatically loaded. Sample indicia created by the system are shown in FIG. 22A-B.

It is intended that the specification and examples be considered as exemplary only. For example, the system may be constructed on one computer as privileged software, distributed across multiple computers, or run on a server with the user interface being transmitted to and presented on the user's client computer. A webmail server or any discrete piece of software could perform all of these functions, presenting the user with the appropriate interface elements, such as information bars and bordered boxes. Respecting a webmail embodiment, one solution recites "webmail providers such as Hotmail and AOL should work to support S/MIME directly in their systems" and "the next step is for webmail providers to obtain S/MIME certificates on behalf of their customers and use those certificates to automatically sign all outgoing mail.

It is a feature that the present system can be constructed and used in cases where the user trusts the messaging service differently than the user's computer. For example, the webmail server has access to the user's signed and encrypted e-mail, but the webmail server cannot forge or decrypt messages without the user's private key. However, any code provided by the webmail server (namely, inside a web browser on the user's computer) may not be trustable because the webmail server could send malicious code: (A) that secretly reads what the user composes in the web browser, (B) that secretly relays decrypted messages in the web browser back to the server, (C) that falsely indicates the trustworthiness of a message (or that slants the trustworthiness of a message in favor of the webmail provider or the sender of the message), or (D) that falsely presents the contents of an encrypted message.

Even in the absence of a malicious webmail server operator, the webmail server could be monitored or otherwise compromised. Thus, in another embodiment, the browser includes an extension embodying some of the system. An extension is a piece of software that modifies the browser's behavior: examples of such technology include "Browser Helper Objects" for Microsoft Internet Explorer and "Extensions" for Mozilla Firefox.

The extension mediates any necessary encrypting, decrypting, signing, and verifying procedures. The extension monitors the unprivileged code from the webmail server for insecure behavior, and may supply some of the aforementioned interface elements of the system. If some preferences are stored non-locally, such as on the webmail server, the extension signs and optionally encrypts such preferences to prevent tampering and optionally to ensure confidentiality. Thus, the reader has seen that at least one described embodiment bootstraps and tracks trust relationships between users, messaging services, and senders of messages. In addition, embodiments of the present invention may compute indicia across different standards and may leverage different standards, such as DKIM, PGP, and the like. For example, DKIM can be used in the embodiments to determine information about relayers of a message, as ascertained through DKIM signers' keys. Indicia can be computed from PGP structures. Information gleaned from the different standards may be presented separately or simultaneously (in space and time). The true scope and spirit of the invention are indicated by the following claims.

What is claimed is:

1. A method of indicating a trustworthiness of a received message, said method comprising:
receiving, via a software program, a message comprising content that has been digitally signed by a digital signer with a digital signature;
accessing a set of cryptographically secure attestations by a third party entity, the third party entity being known to software that received the message;
successfully identifying a cryptographic key that was used to sign the message and an entity that holds the key, the successfully identifying comprising determining cryptographically secure bindings associated with the message, the cryptographically secure bindings being between said content, said message, and said digital signer, and between said digital signer and said third party entity;
successfully verifying that the digital signature of the message is cryptographically associated with the identified cryptographic key;
calculating, using one or more computer hardware processors, a set of indicia from the message and said cryptographically secure attestations;
presenting said indicia to a user; and
after the successfully identifying the cryptographic key and the successfully verifying that the digital signature of the message is cryptographically associated with the identified cryptographic key, requesting said user to modify the indicia that were calculated from the message.

2. The method of claim 1, wherein the digital signer is a sender of the message.

3. The method of claim 1, wherein the digital signer is a recipient of the message.

4. The method of claim 1, wherein the digital signer is a third party that is trusted by at least one of a recipient or the sender.

5. The method of claim 1, wherein said digital signer is a certificate authority.

6. The method of claim 1, wherein said digital signature is based on asymmetric cryptography.

7. The method of claim 1, wherein said cryptographically secure attestations include an attestation of a time.

8. The method of claim 7, wherein the attestation of time is cryptographically signed.

9. The method of claim 7, wherein the attestation of time is a part of a message having an attestation by a third party.

10. The method of claim 9, wherein the attestation by the third party is party of an online certificate status protocol response.

11. The method of claim 1, wherein said cryptographically secure attestations include an attestation about the digital signer.

12. The method of claim 1, wherein a trusted introducer has introduced a sender of the message to a recipient of the message.

13. A non-transitory computer readable medium comprising executable program code that configures a hardware processor to perform operations comprising:
receiving, via a software program, a message comprising content that has been digitally signed by a digital signer with a digital signature;
accessing cryptographically secure attestations by a third party entity that is known to software that received the message;
successfully identifying a cryptographic key that was used to sign the message and an entity that holds the key, the successfully identifying comprising determining cryptographically secure bindings associated with the message, the cryptographically secure bindings being between said content, said message, and said digital signer, and between said digital signer and said third party entity;
successfully verifying the digital signature of the message is associated with the identified cryptographic key;
calculating, using one or more computer hardware processors, a set of indicia from the message and said cryptographically secure attestations;
presenting said indicia to a user; and
after the successfully identifying the cryptographic key and the successfully verifying the digital signature of the message, requesting said user to modify the indicia that were calculated from the message.

14. A method of assessing trustworthiness of a received message, said method comprising:
receiving, via a software program, a message comprising content that is digitally signed by a digital signer;
accessing one or more cryptographically secure attestations by a trusted entity;
identifying a cryptographic key was used to sign the message and an entity that holds the key, the identifying comprising determining cryptographically secure bindings associated with the cryptographic key, the cryptographically secure bindings being between said content, said message, and said digital signer, and between said digital signer and said trusted entity;
verifying that the message is cryptographically associated with the identified cryptographic key;
calculating, using one or more computer hardware processors, one or more indicia from secure bindings associated with the cryptographic key, the calculation being based on said cryptographically secure attestations;
determining at least one role from said indicia, the at least one role indicating a class of a sender; and
modifying the message based on said role and said indicia presented to a recipient of the received message, the modified message including role-specific information that relates to the at least one role.

15. The method of claim 14, wherein the digital signer is a sender of the message.

16. The method of claim 14, wherein the digital signer is a recipient of the message.

17. The method of claim 14, wherein the digital signer is a third party that is trusted by at least one of the recipient or a sender.

18. The method of claim 14, wherein modifying the message comprises withholding display of the message to the recipient based on the role.

19. The method of claim 14, wherein said modifying the message restricts a reference to a predetermined permutation of resources.

20. The method of claim 19, wherein said reference is to a resource to be loaded inline with said message.

21. The method of claim 19, wherein said reference is to a resource to be loaded external to said message.

22. The method of claim 19, wherein said predetermined permutation of resources indicates a time associated with the message.

23. The method of claim 14, wherein said indicia indicate an origin of said message.

24. The method of claim 14, wherein said message is an e-mail.

25. The method of claim 14, further comprising:
determining whether the message is related to at least one other message previously sent by the recipient; and
composing a notification based on the whether the message is related to at least one other message sent by the recipient.

26. The method of claim 14, further comprising:
determining whether the message is related to at least one other message previously sent by a party that is trusted by the recipient; and
composing a notification based on the whether the message is related to at least one other message sent by the party that is trusted by the recipient.

27. A non-transitory computer readable medium comprising executable program code that configures a hardware processor to perform operations comprising:
receiving, via a software program, a message comprising content and a digital signature;
accessing one or more cryptographically secure attestations by a trusted entity;
identifying a cryptographic key was used to sign the message and an entity that holds the key, the identifying comprising determining cryptographically secure bindings associated with the cryptographic key, the cryptographically secure bindings being between said content, said message, and said digital signer, and between said digital signer and said trusted entity;

verifying that the digital signature is cryptographically associated with the identified cryptographic key;

calculating, using one or more computer hardware processors, one or more indicia from secure bindings associated with the cryptographic key, the calculation being based on said cryptographically secure attestations;

determining at least one role from said indicia, the at least one role indicating a class of a sender; and modifying the message based on said role and said indicia presented to a recipient of the received message, the modified message including role-specific information that relates to the at least one role.

* * * * *